(12) United States Patent
Sampson et al.

(10) Patent No.: US 11,142,286 B2
(45) Date of Patent: Oct. 12, 2021

(54) SNOWMOBILE

(71) Applicant: Polaris Industries Inc., Medina, MN (US)

(72) Inventors: Martin E. Sampson, Roseau, MN (US); Lyle J. Dahlgren, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 204 days.

(21) Appl. No.: 15/255,604

(22) Filed: Sep. 2, 2016

(65) Prior Publication Data
US 2016/0368563 A1 Dec. 22, 2016

Related U.S. Application Data

(63) Continuation of application No. 14/849,361, filed on Sep. 9, 2015, now Pat. No. 10,766,571, which is a continuation of application No. 13/773,326, filed on Feb. 21, 2013, now abandoned, which is a continuation of application No. 12/782,363, filed on May 18, 2010, now Pat. No. 8,381,857, which is a continuation-in-part of application No. 11/501,456, filed on Aug. 9, 2006, now abandoned.

(51) Int. Cl.
B62M 27/02 (2006.01)
B62M 27/00 (2006.01)
B60K 11/04 (2006.01)

(52) U.S. Cl.
CPC ............. B62M 27/02 (2013.01); B60K 11/04 (2013.01); B62M 27/00 (2013.01); B62M 2027/027 (2013.01); B62M 2027/028 (2013.01)

(58) Field of Classification Search
CPC ............. B62M 27/00; B62M 27/02; B62M 2027/027; B62M 2027/028; B60K 11/04
USPC ........................................ 180/182, 190, 68.4
See application file for complete search history.

(56) References Cited

U.S. PATENT DOCUMENTS

| | | |
|---|---|---|
| 905,704 A | 12/1908 | Johnson |
| 1,315,360 A | 9/1919 | Blystad |
| 1,650,334 A | 11/1927 | Eliason |
| 3,528,520 A | 9/1970 | Aaron |
| 3,572,813 A | 3/1971 | Takada |
| 3,575,474 A | 4/1971 | Russ, Sr. |
| 3,613,205 A | 10/1971 | Takada |
| 3,712,416 A | 1/1973 | Swanson et al. |
| 3,722,961 A | 3/1973 | Haley et al. |
| 3,732,939 A | 5/1973 | Samson |
| 3,781,067 A | 12/1973 | Masters et al. |
| 3,804,455 A | 4/1974 | Gorski |
| 3,835,948 A | 9/1974 | Ducio |
| 3,840,082 A | 10/1974 | Olson |
| 3,840,083 A | 10/1974 | Woods |

(Continued)

FOREIGN PATENT DOCUMENTS

| | | |
|---|---|---|
| CA | 2109241 A1 | 2/1995 |
| CA | 2244520 A1 | 1/2000 |

(Continued)

Primary Examiner — Anne Marie M Boehler
(74) Attorney, Agent, or Firm — Faegre Drinker Biddle & Reath LLP

(57) ABSTRACT

The present invention generally relates to snowmobiles. More particularly, the present invention relates to the components of a snowmobile such as the frame, skis, motor, and endless belt assembly.

9 Claims, 33 Drawing Sheets

(56) References Cited

U.S. PATENT DOCUMENTS

| | | | |
|---|---|---|---|
| 3,871,460 A | 3/1975 | Dehnert | |
| 3,901,335 A | 8/1975 | Johnson | |
| 3,966,004 A | 6/1976 | Rose | |
| 3,981,373 A | 9/1976 | Irvine | |
| 4,046,219 A | 9/1977 | Shaikh | |
| 4,146,101 A | 3/1979 | Plourde | |
| 4,241,929 A | 12/1980 | Curry | |
| 4,491,333 A | 1/1985 | Warnke | |
| D291,344 S | 8/1987 | Jonsson | |
| 4,892,165 A | 1/1990 | Yasui et al. | |
| 5,129,473 A | 7/1992 | Boyer | |
| 5,474,146 A | 12/1995 | Yoshioka et al. | |
| 5,533,585 A | 7/1996 | Kawano et al. | |
| 5,568,840 A * | 10/1996 | Nagata | B62M 27/02 180/190 |
| 5,685,387 A | 11/1997 | Rioux et al. | |
| 5,700,020 A | 12/1997 | Noble | |
| 5,881,834 A | 3/1999 | Karpik | |
| 5,944,133 A * | 8/1999 | Eto | B62M 27/02 180/190 |
| 5,957,230 A | 9/1999 | Harano et al. | |
| 6,012,728 A | 1/2000 | Noble | |
| 6,109,217 A | 8/2000 | Hedlund et al. | |
| 6,431,561 B1 | 8/2002 | Hedlund | |
| 6,446,744 B2 | 9/2002 | Wubbolts et al. | |
| 6,604,594 B2 | 8/2003 | Wubbolts et al. | |
| 6,626,444 B2 | 9/2003 | Noble | |
| 6,681,724 B1 | 1/2004 | Berg | |
| 6,682,085 B2 | 1/2004 | Furuhashi et al. | |
| 6,755,271 B1 | 6/2004 | Berg | |
| 6,758,497 B2 | 7/2004 | Bergman | |
| 6,772,852 B2 | 8/2004 | Morin et al. | |
| 6,863,142 B2 | 3/2005 | Corbeil | |
| 6,892,844 B2 | 5/2005 | Atsuumi | |
| 6,926,107 B2 | 8/2005 | Nishijima | |
| RE39,012 E | 3/2006 | Noble | |
| 7,048,293 B2 | 5/2006 | Bedard | |
| 7,055,454 B1 | 6/2006 | Whiting | |
| 7,080,706 B2 | 7/2006 | Vaisanen | |
| 7,124,848 B2 | 10/2006 | Girouard et al. | |
| 7,134,520 B2 | 11/2006 | Yatagai et al. | |
| 7,150,336 B2 | 12/2006 | Desmarais | |
| 7,232,134 B2 | 6/2007 | Ruzewski et al. | |
| 7,252,301 B2 | 8/2007 | Vaelikangas | |
| 7,322,435 B2 | 1/2008 | Lillbacka et al. | |
| 7,328,765 B2 | 2/2008 | Ebert et al. | |
| 7,353,898 B1 | 4/2008 | Bates, Jr. | |
| 7,357,201 B2 | 4/2008 | Jordan | |
| 7,487,975 B2 | 2/2009 | Pryputniewicz | |
| 7,503,568 B2 | 3/2009 | Mehrmann | |
| 7,530,341 B2 | 5/2009 | Carpenter | |
| 7,533,749 B1 | 5/2009 | Sampson et al. | |
| 7,584,821 B2 | 9/2009 | Prior et al. | |
| 7,607,673 B1 | 10/2009 | Vey | |
| 7,775,313 B1 | 8/2010 | Sampson et al. | |
| 7,802,644 B2 | 9/2010 | Brodeur et al. | |
| 7,870,920 B1 | 1/2011 | Dahlgren et al. | |
| 7,942,236 B2 | 5/2011 | Hagiwara | |
| 7,967,106 B2 | 6/2011 | Ross et al. | |
| 7,997,372 B2 | 8/2011 | Maltais | |
| 8,191,665 B1 | 6/2012 | Sampson et al. | |
| 8,201,536 B2 | 6/2012 | Hazelton et al. | |
| 8,381,857 B1 | 2/2013 | Sampson et al. | |
| 8,567,546 B2 | 10/2013 | Berg | |
| 8,733,773 B2 | 5/2014 | Sampson | |
| 8,776,755 B2 | 7/2014 | Muller et al. | |
| 8,919,477 B2 | 12/2014 | Conn | |
| 8,944,204 B2 | 2/2015 | Ripley | |
| 9,022,160 B2 | 5/2015 | Smith | |
| 9,063,832 B2 | 6/2015 | Schlangen | |
| 9,075,699 B2 | 7/2015 | Wetterlund | |
| 9,096,289 B2 | 8/2015 | Hedlund | |
| 9,152,607 B2 | 10/2015 | Wetterlund | |
| 9,352,802 B2 | 5/2016 | Sampson | |
| 9,446,810 B2 | 9/2016 | Ripley | |
| 2001/0013687 A1 | 8/2001 | Cormican | |
| 2002/0074752 A1 | 6/2002 | Noble | |
| 2002/0129984 A1 | 9/2002 | Wubbolts et al. | |
| 2003/0047368 A1 | 3/2003 | Morin et al. | |
| 2003/0070854 A1 | 4/2003 | Bergman | |
| 2003/0137117 A1 | 7/2003 | Lund et al. | |
| 2003/0150658 A1 | 8/2003 | Nakano et al. | |
| 2003/0159868 A1 | 8/2003 | Alexander | |
| 2003/0183436 A1 | 10/2003 | Karpik | |
| 2004/0069474 A1 * | 4/2004 | Wu | F28D 1/0308 165/170 |
| 2004/0173390 A1 | 9/2004 | Karpik | |
| 2004/0182624 A1 | 9/2004 | Yatagai et al. | |
| 2004/0188160 A1 | 9/2004 | Yoshihara | |
| 2004/0211608 A1 | 10/2004 | Morin et al. | |
| 2004/0262064 A1 | 12/2004 | Lefort | |
| 2005/0034909 A1 | 2/2005 | Vaisanen | |
| 2005/0115700 A1 * | 6/2005 | Martin | B23K 1/0012 165/170 |
| 2005/0126839 A1 | 6/2005 | Rasidescu et al. | |
| 2005/0173873 A1 | 8/2005 | Ruzewski et al. | |
| 2005/0205322 A1 | 9/2005 | Girouard et al. | |
| 2006/0032686 A1 | 2/2006 | Berg | |
| 2006/0032700 A1 | 2/2006 | Vizanko | |
| 2006/0061051 A1 | 3/2006 | Lemieux | |
| 2006/0108164 A1 | 5/2006 | Wubbolts et al. | |
| 2006/0162976 A1 | 7/2006 | Desmarais | |
| 2006/0170195 A1 | 8/2006 | Valikangas | |
| 2007/0114085 A1 | 5/2007 | Girouard et al. | |
| 2007/0193715 A1 * | 8/2007 | Bergman | B60K 11/04 165/41 |
| 2010/0071981 A1 | 3/2010 | Nakamura et al. | |
| 2013/0032420 A1 | 2/2013 | Mills | |
| 2013/0193676 A1 | 8/2013 | Mertens | |
| 2014/0065936 A1 | 3/2014 | Smith | |
| 2015/0375826 A1 | 12/2015 | Sampson et al. | |

FOREIGN PATENT DOCUMENTS

| | | |
|---|---|---|
| CA | 2400127 A1 | 8/2003 |
| CA | 2451017 A1 | 5/2004 |
| FR | 2662610 A1 | 12/1991 |

* cited by examiner

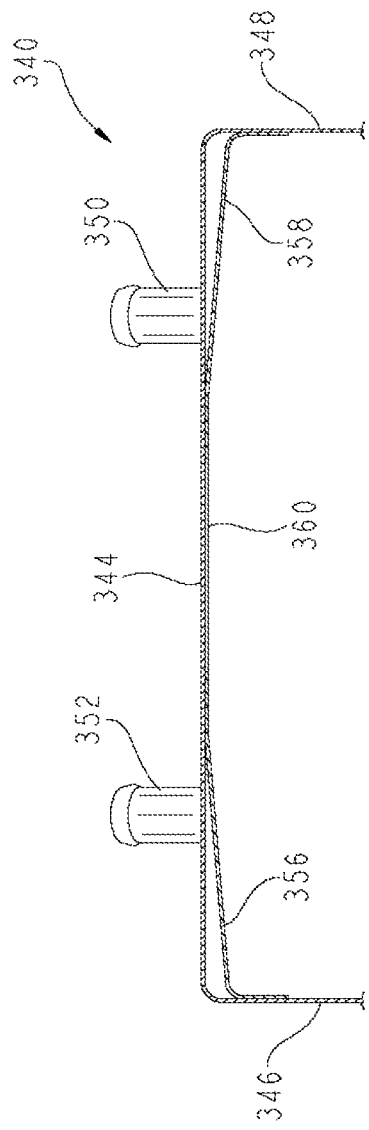
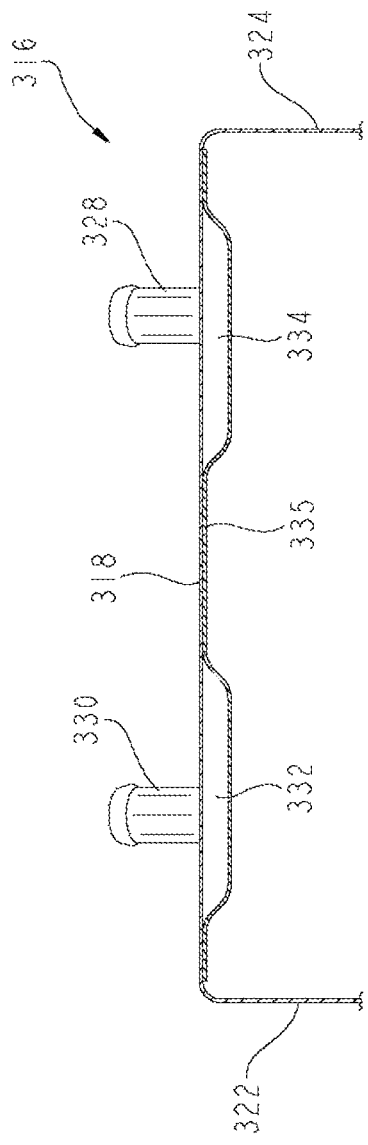

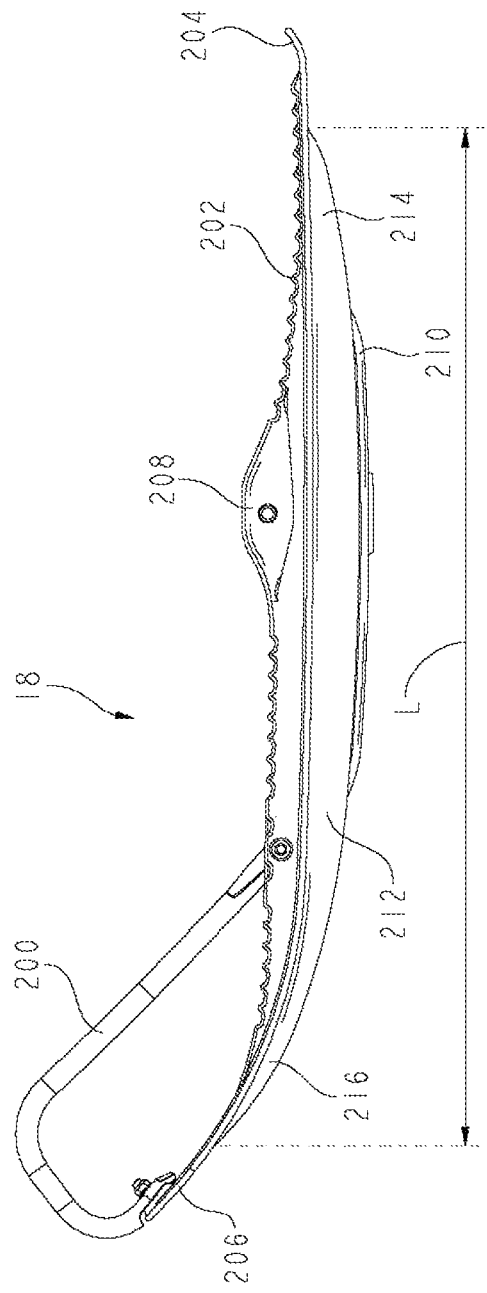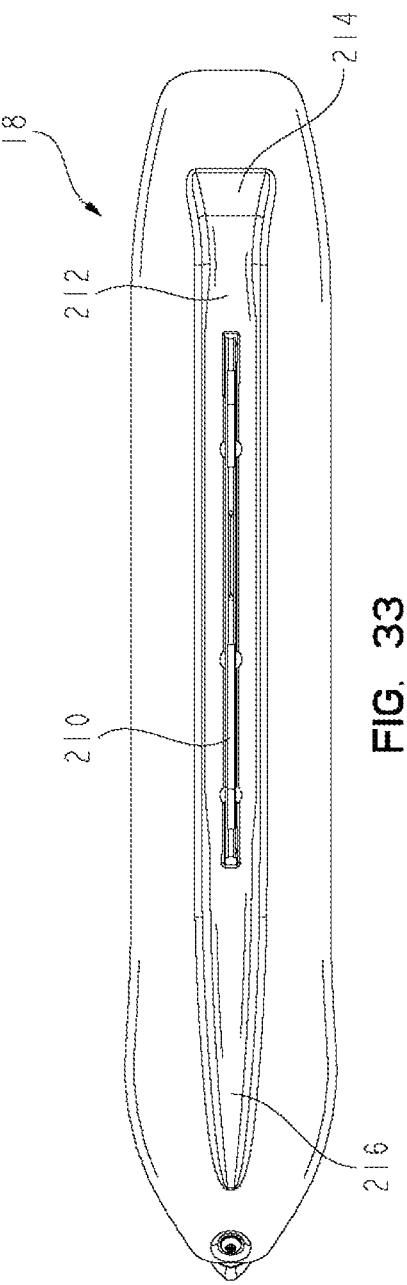

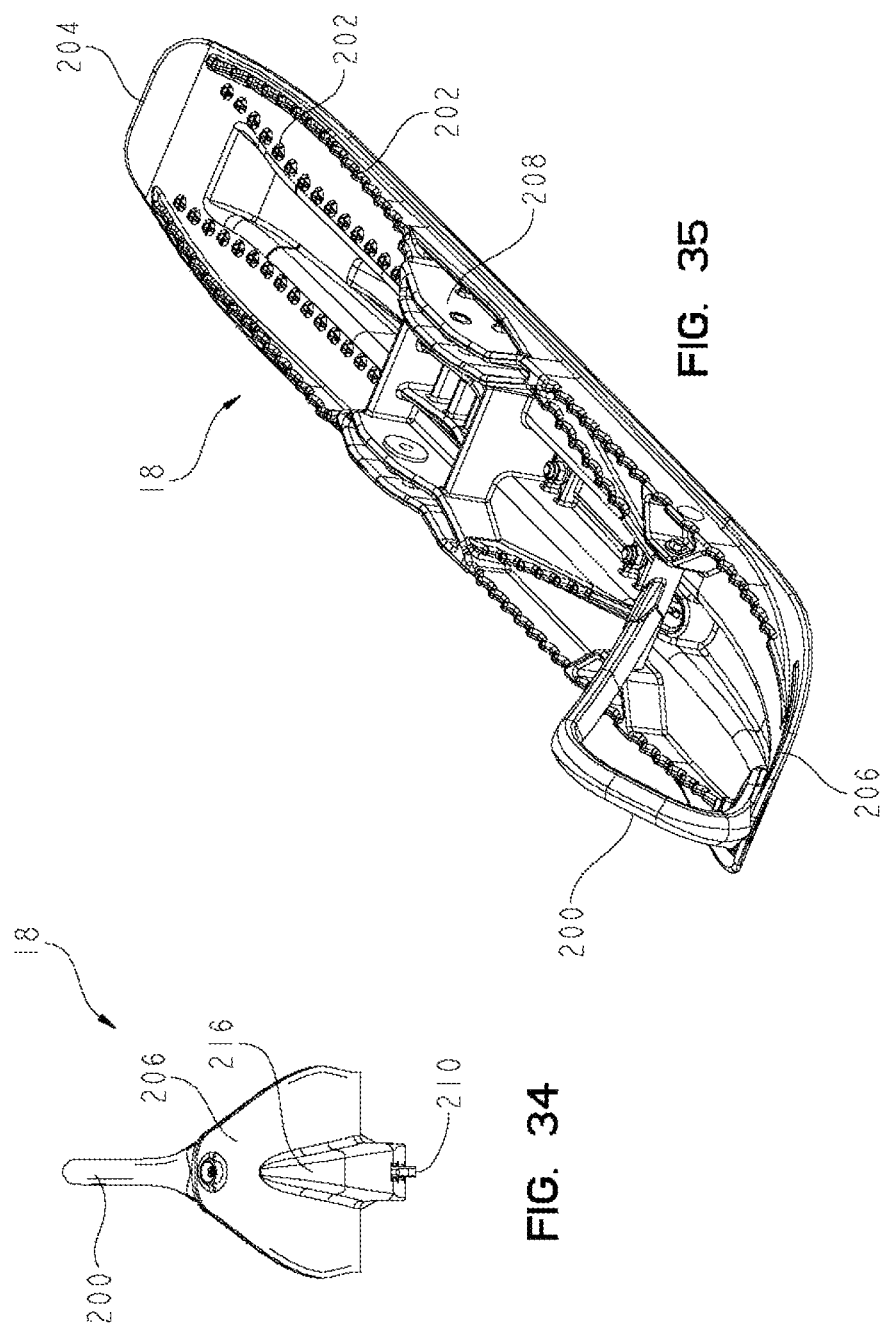

SNOWMOBILE

CLAIM OF PRIORITY

This application is a continuation of application Ser. No. 14/849,361 filed on Sep. 9, 2015 (pending), which is a continuation of Ser. No. 13/773,326 filed on Feb. 21, 2013 (abandoned), which is a continuation of Ser. No. 12/782,363 filed on May 18, 2010 (now U.S. Pat. No. 8,381,857), which is a continuation-in-Part of Ser. No. 11/501,456 filed on Aug. 9, 2006 (abandoned), the subject matter of all such applications being incorporated herein by reference.

FIELD OF THE INVENTION

The present invention generally relates to snowmobiles. More particularly, the present invention relates to the components of a snowmobile such as the frame, skis, motor, and endless belt assembly.

BACKGROUND OF THE INVENTION

Generally, there are a variety of configurations of snowmobiles available for applications such as deep snow, high performance, luxury touring, trail riding, etc. Most snowmobiles include a frame, a motor, a pair of front skis, and an endless belt assembly. Typically, features such as engine displacement and track length vary depending upon the specific application for which the snowmobile is targeted. For example, snowmobiles designed primarily for deep snow application may include an endless belt assembly having a longer track length, i.e. 166 inches, than a snowmobile designed primarily for trail riding, i.e. 135 inches. A snowmobile designed for deep snow may also include a relatively large displacement engine, i.e. 900 $cc^3$, to provide suitable power when operating in a mountain environment at higher elevations with less oxygen. Other features of a deep snow snowmobile may be added to improve ride and handling characteristics such as side hilling.

SUMMARY OF THE INVENTION

One illustrative embodiment of the present invention includes a snowmobile comprising a frame, a motor supported by the frame, an endless belt assembly supported by the frame, a pair of steering spindle operably coupled to the frame, and a pair of front skis operably coupled to the steering spindle, each of the front skis including upper and lower surfaces, the lower surfaces including a runner, the upper surfaces including a plurality of projections adapted to provide traction to an operator.

Another illustrative embodiment of the present invention includes a snowmobile comprising a frame, a motor supported by the frame, an endless belt assembly supported by the frame, a pair of steering arms operably coupled to the frame, and a pair of front skis operably coupled to the steering arms, each of the front skis including front and rear ends and inner and outer edges, the outer edge of the rear end of each ski including a notch.

Yet another illustrative embodiment of the present invention includes a snowmobile comprising a frame, a motor supported by the frame, an endless belt assembly supported by the frame, a pair of steering arms operably coupled to the frame, and a pair of front skis operably coupled to the steering arms, each of the front skis including front and rear ends and inner and outer edges, the inner and outer edge of the rear end of each ski including a notch.

Another embodiment of the present invention includes a snowmobile comprising a frame assembly including a steering hoop structure and a tunnel, the tunnel including a center plate and first and second side panels, the steering hoop structure coupled to the first and second side panels and extending above the tunnel, the first and second side panels each including a running board supported by the steering hoop structure, the steering hoop structure including a toe clip positioned adjacent to each of the running boards, a steering assembly supported by the steering hoop structure, a motor supported by the frame, and an endless belt assembly supported by the frame.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 18 is a cross-sectional view taken across a middle section of the tunnel assembly shown in FIGS. 16 and 17;

FIG. 19 is a cross-sectional view taken across a middle section of the tunnel assembly shown in FIGS. 14 and 15;

FIG. 32 is a profile view of the front ski shown in FIG. 31;

FIG. 33 is a bottom side view of the front ski shown in FIGS. 31 and 32;

FIG. 34 is a front view of the front ski shown in FIGS. 31-33;

FIG. 35 is a perspective view of the top side of the front ski shown in FIGS. 31-34;

Figure 1:
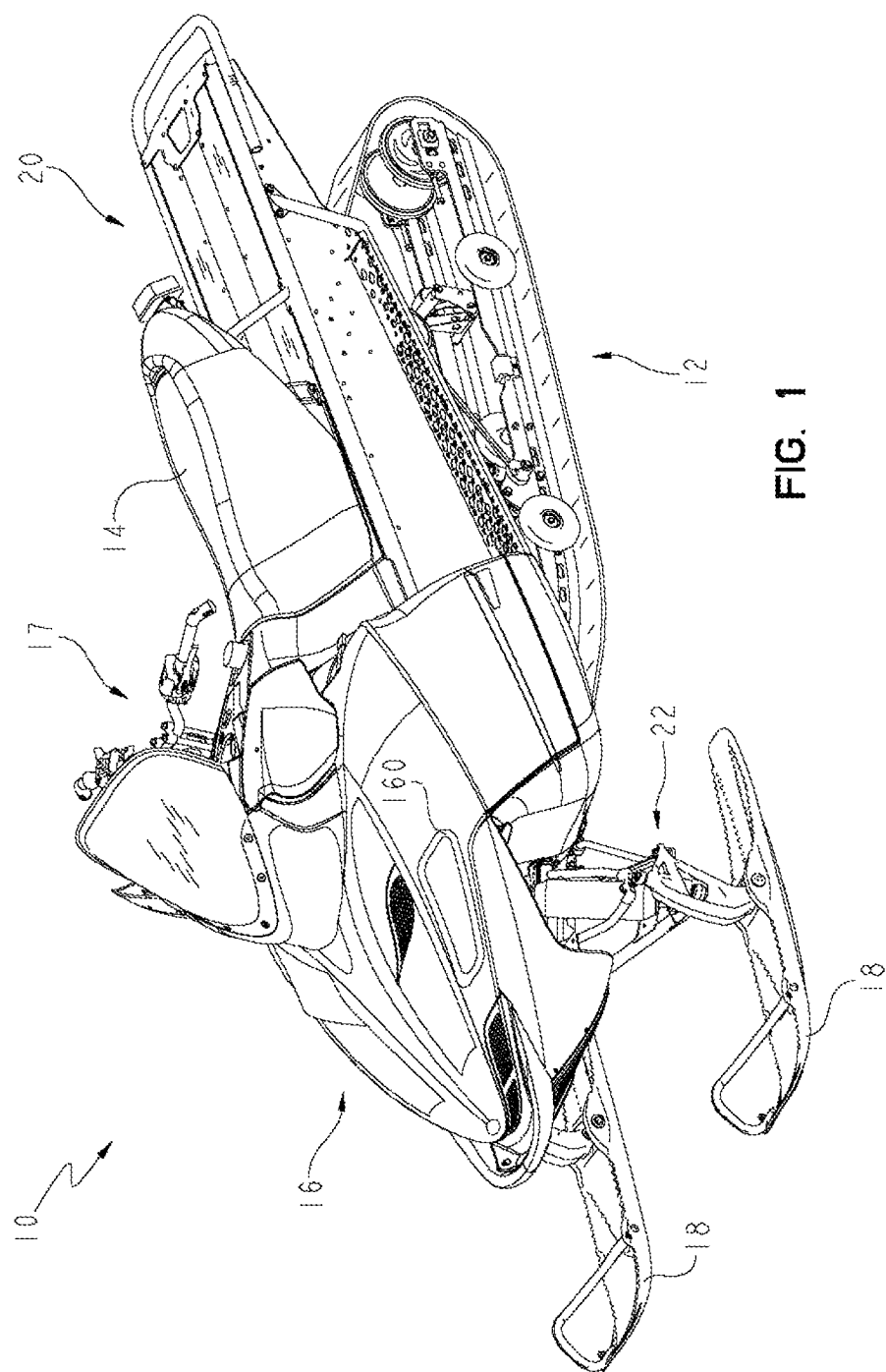
FIG. 1 is a perspective view of an illustrative embodiment snowmobile.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF EMBODIMENTS OF THE INVENTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to a snowmobile, it should be understood that the principles of the invention apply equally to other snow vehicles. While the present invention primarily involves an snowmobile, it should be understood, however, that the invention may have application to other types of vehicles, such as motorcycles, ATVs, utility vehicles, scooters, and mopeds.

Referring to FIG. 1, one illustrative embodiment of a snowmobile 10 is shown. Snowmobile 10 includes, endless belt assembly 12, seat assembly 14, hood 16, steering assembly 17, front skis 18, frame 20, and steering arms 22. Steering assembly 17 is operably coupled to steering arms 22 and allows a rider to steer snowmobile 10. A motor, not shown, is covered by hood 16 and provides power to endless belt assembly 12.

Figure 2:
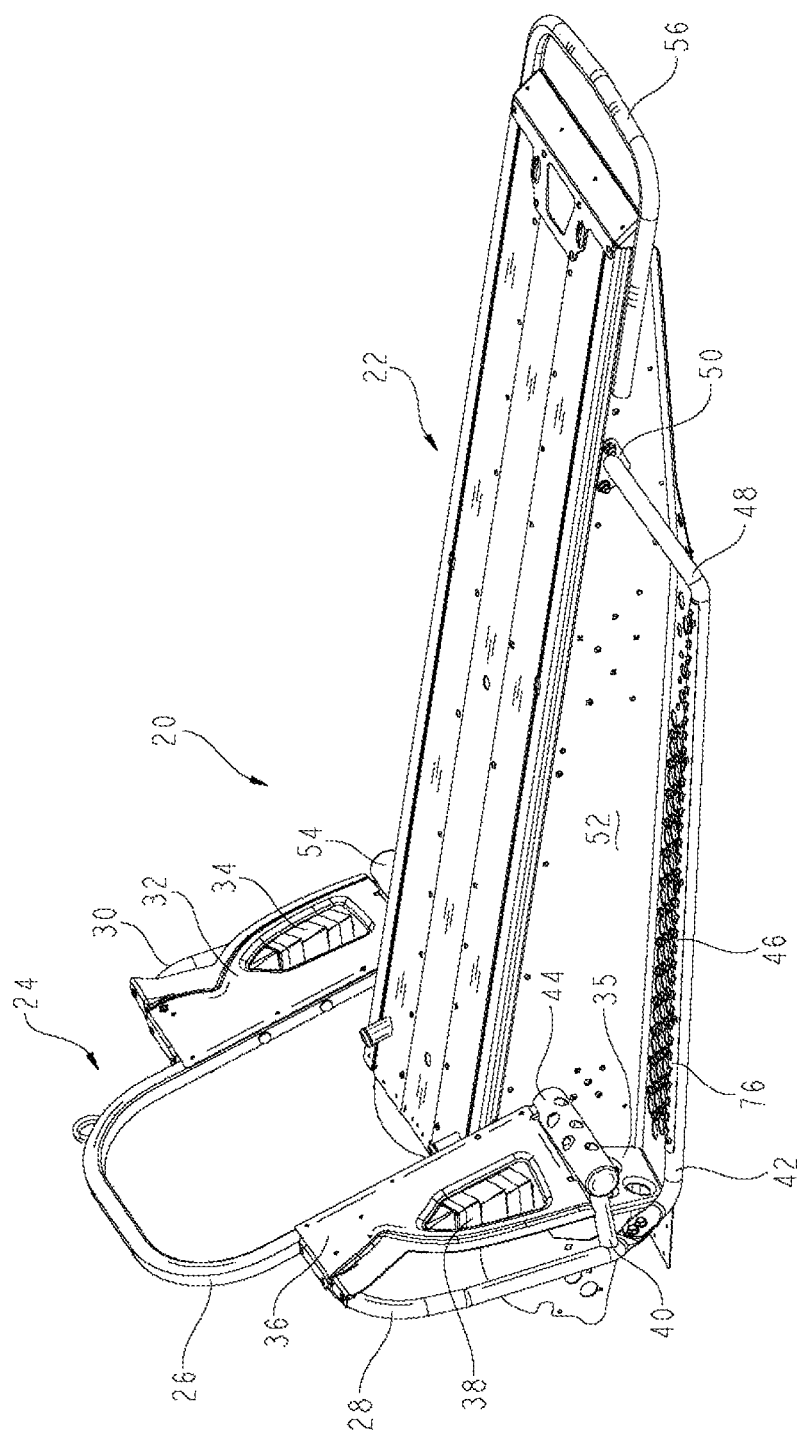
FIG. 2 is a perspective view of one embodiment of an integral frame and tunnel system of the snowmobile shown in FIG. 1.
Figure 3:
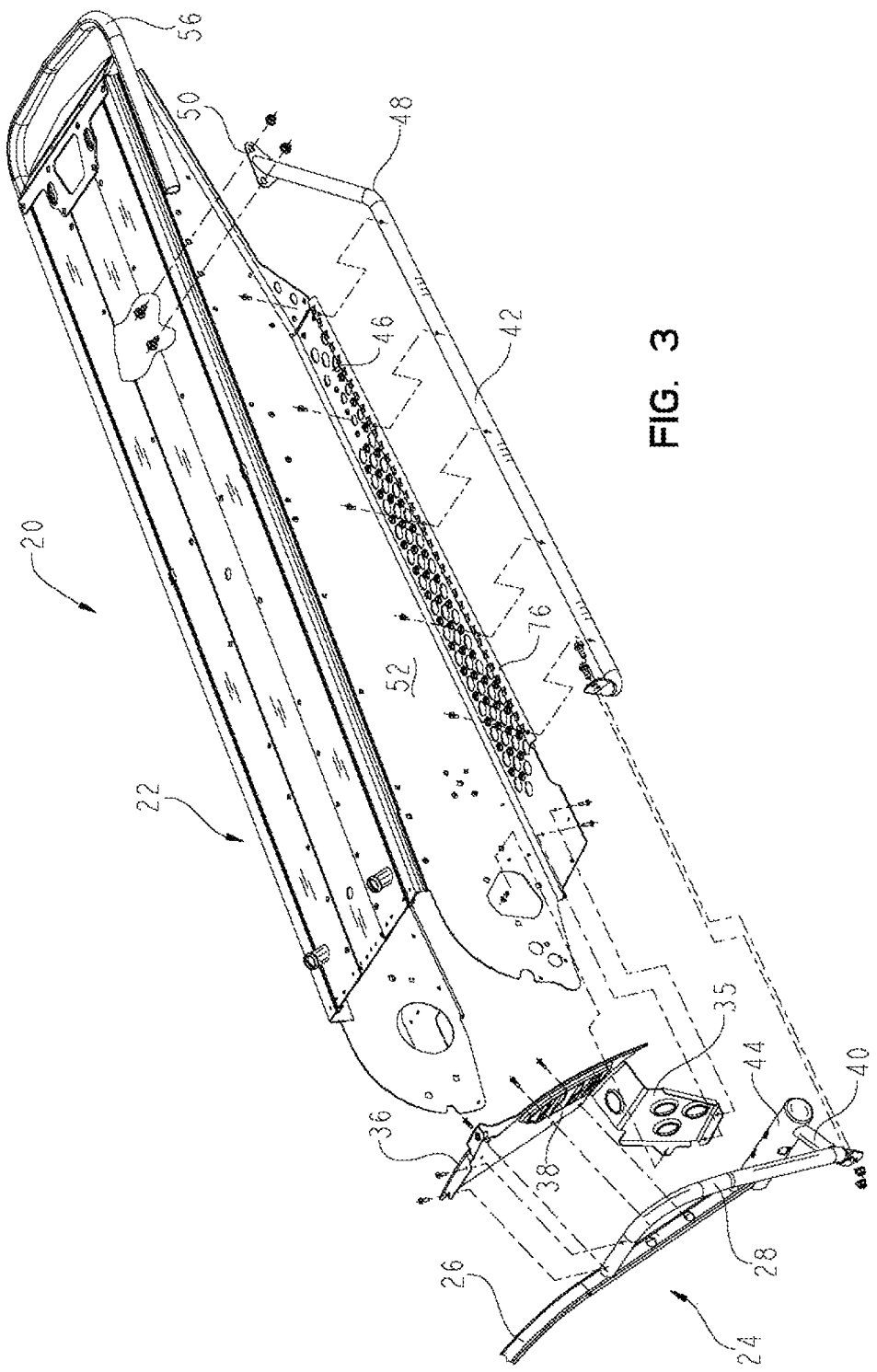
FIG. 3 is an exploded view of the left side of the integral frame and tunnel assembly shown in FIG. 2.

Referring now to FIG. 2, tunnel assembly 22 and integrated steering hoop assembly 24 of frame 20 are shown. Steering hoop assembly 24 supports steering assembly 17 of snowmobile 10 and provides structural support to snowmobile 10. Steering hoop assembly 24 also provides attachment points for body panels such as the hood. Additionally, steering hoop assembly 24 provides lateral support in the event of snowmobile roll-over and prevents or reduces body panel collapse. Steering hoop assembly 24 includes inner hoop 26 and outer hoop extensions 28 and 30. Inner hoop 26 extends around the motor of snowmobile 10. Referring now to the components on the left side of frame 20, best shown in FIG. 3, an upper end of outer hoop 28 couples to inner hoop 26. A lower end of outer hoop 28 couples to longitudinally extending tube 42. Additionally, extension 40 extends rearwardly from the lower end of outer hoop 28. Extension 40 is coupled to one end of tube 44. The opposing end of tube 44 is coupled to inner hoop 26.

Console side 36 is coupled to inner hoop 26 and outer hoop 28. Console side 36 includes louvered portion 38 and lower portion 35. Both louvered portion 38 and lower portion 35 allow heated air from the engine compartment under hood 16 to exit the engine compartment and provide heat to a rider's leg and boot. Lower portion 35 is coupled to running board 46. In this embodiment, running board 46 is integral with side panel 52 of tunnel assembly 22, however running board 46 may be a separate component. Outer edge 76 of running board 46 is supported by longitudinally extending tube 42 substantially along the length of running board 46. Longitudinally extending tube 42 includes offset portion 48 and bracket 50 which is coupled to side panel 52 of tunnel 22.

Figure 4:
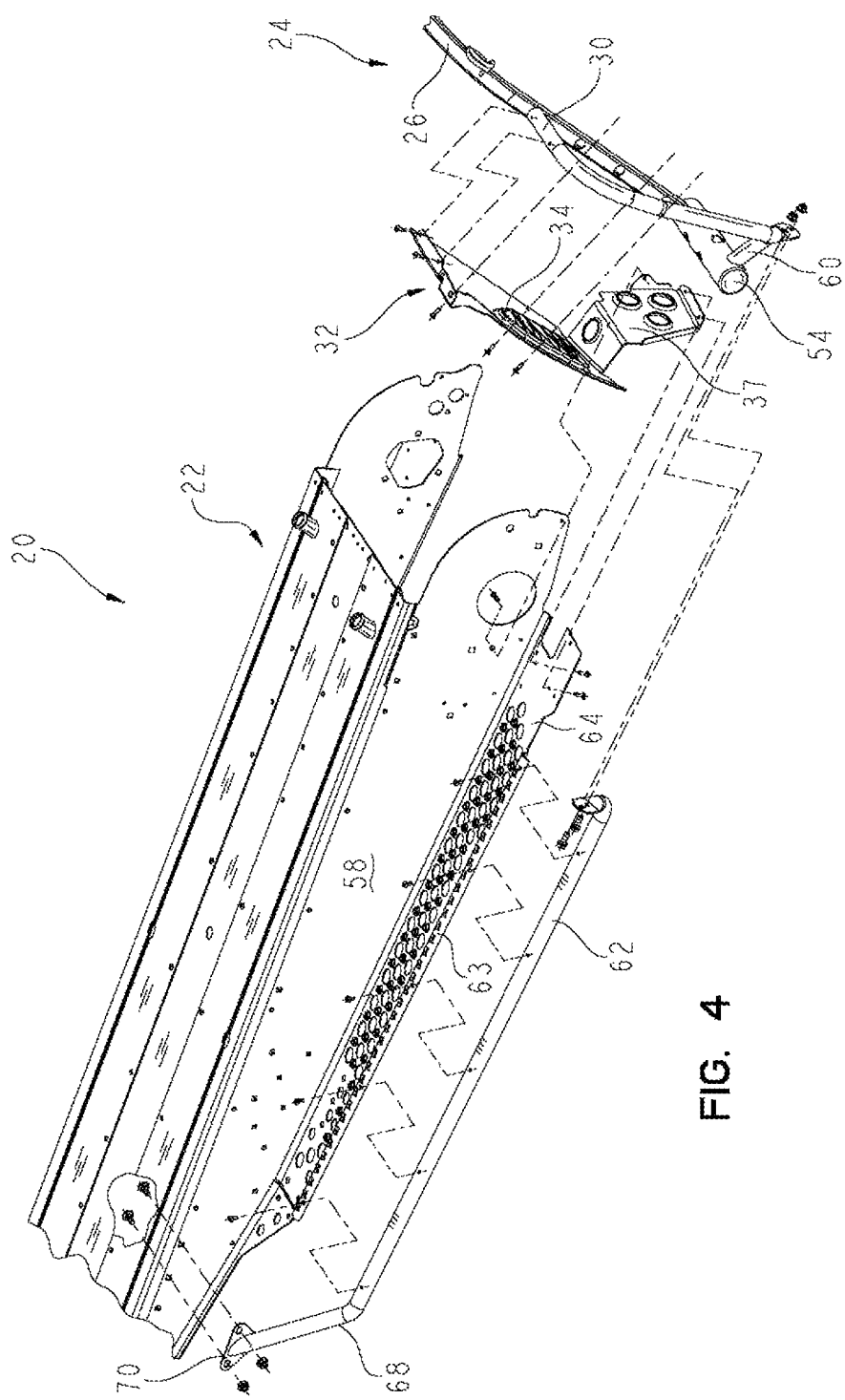
FIG. 4 is an exploded view of the right side of the integral frame and tunnel assembly shown in FIGS. 2 and 3.

Referring now to FIG. 4, the components of the right side of frame 20 is shown. The components on the right side of frame 20 are in a similar arrangement and compliment the components on the left side of frame 20. Outer hoop 30 is coupled on an upper end to inner hoop 26. A lower end of outer hoop 30 is coupled to longitudinally extending tube 62. The lower end of outer tube 30 also includes extension 60 which is coupled to one end of tube 54. The opposing end of tube 54 is coupled to inner hoop 26. Console side 32 is coupled to outer hoop 30 and includes louvered portion 34 and lower portion 37. Louvered portion 34 is similar to louvered portion 38 of console side 36. Lower portion 37 of console side 32 couples to running board 64 which, in this embodiment, is integral with side panel 58 of tunnel 22.

Running board 64 includes outer edge 63 which is supported by longitudinally extending tube 62. Longitudinally extending tube 62 includes offset portion 68 and bracket 70 which couples to side panel 58 of tunnel 22. Offset portions 48 and 68 of longitudinally extending tubes 42 and 62 may be used as handle portions by snowmobile operator. Offset portions 48 and 68 extend upwardly and rearward to bracket 70 to provide the rider with a handle that is generally perpendicular to running board 64. Additionally, tube 56 which is coupled on a first end to a rear section of side panel 52 and on a second end to a rear portion of side panel 58 may be used as a handle portion by a snowmobile operator.

Figure 5:
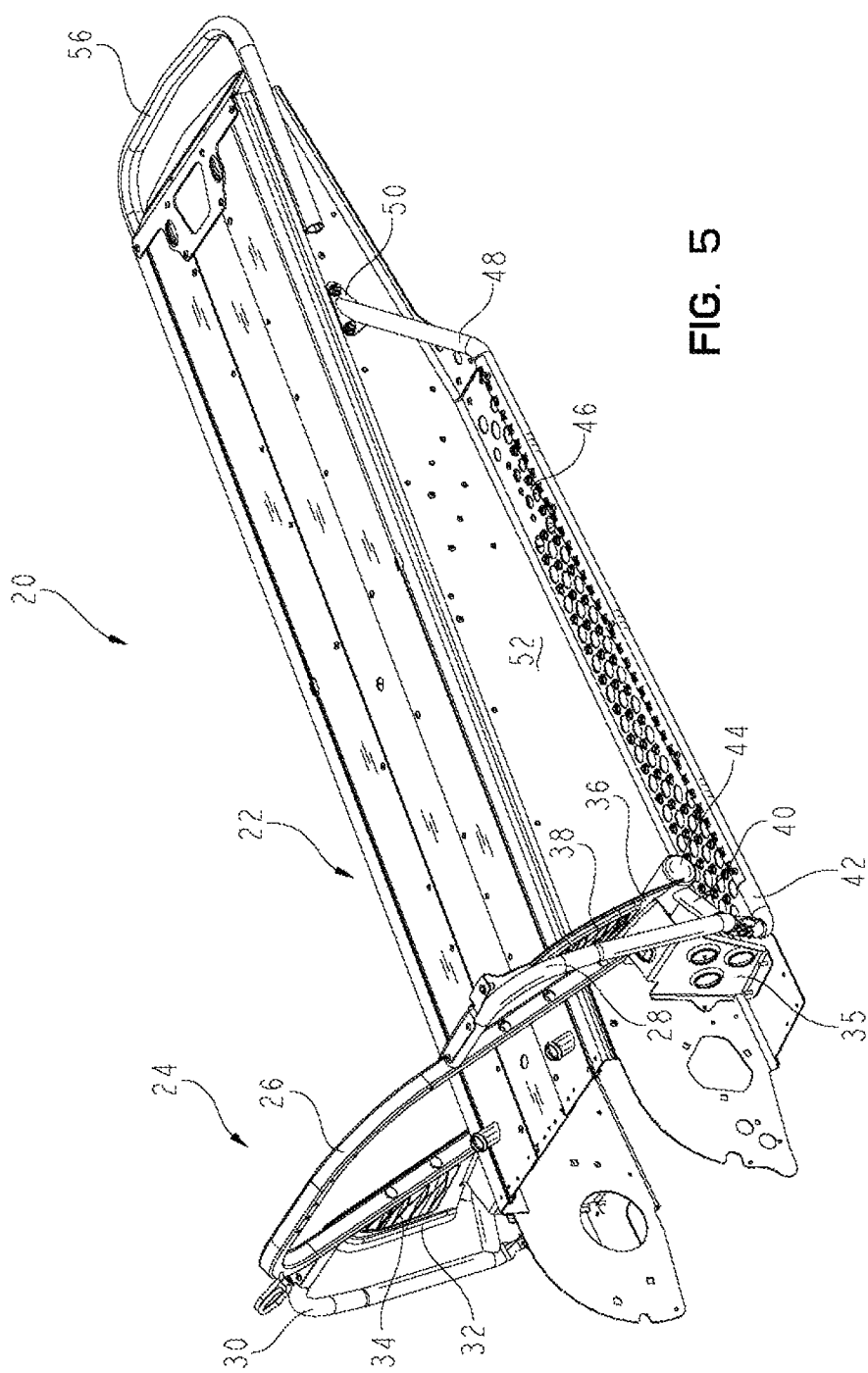
FIG. 5 is a perspective view of the front end of the integral frame and tunnel assembly shown in FIGS. 2-4.

Referring now to FIGS. 1 and 5, a rider positioned on seat assembly 14 has a boot positioned on each running board 46 and 63. The rider's boots are positioned substantially below tubes 44 and 54 of integral steering hoop assembly 24. In this orientation, a rider may contact or hook the toe of each boot under tubes 44 and 54 to maintain balance or control of snowmobile 10 during snowmobiling.

Figure 6:
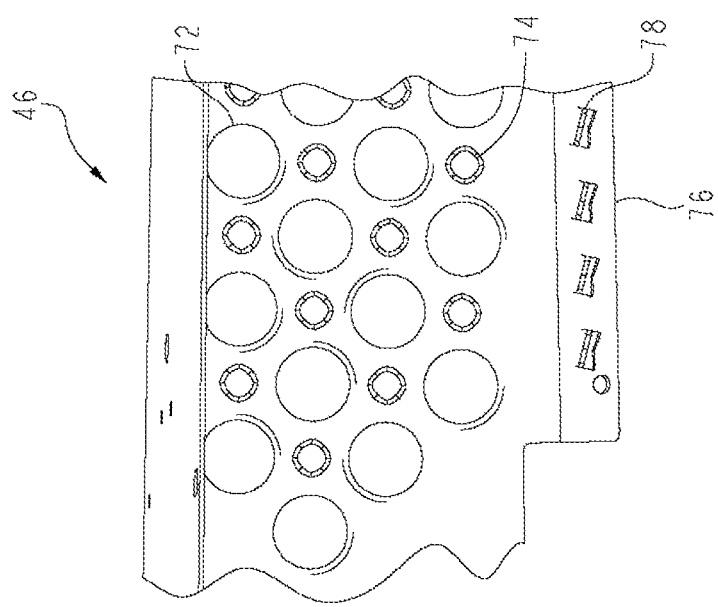
FIG. 6 is a partial view of one embodiment of a running board of the snowmobile shown in FIG. 1.

Referring now to FIG. 6, a partial section of one embodiment of running board 46 is shown. In this embodiment, running board 46 includes a plurality of apertures 72 adapted to allow snow and ice from a rider's boot to pass through and a plurality of extensions 74 to engage a rider's boot. In this embodiment, apertures 72 a substantially flat to allows snow and water collected on running board 46 to exit. Additionally, running board 46 includes a plurality of offset projections 78 on outer edge 76. Offset projection 78 have an angular orientation relative to a longitudinal axis of running board 46. The angular orientation of projections 78 or skewed relationship of projections 78 to the running board 46 provides traction to a rider's boot. In this embodiment of snowmobile 10, running board 63 also includes the features of running board 46 described above. It should be noted that any suitable arrangement of drainage apertures and/or traction devices may be used on running boards 46 and 63 of snowmobile 10.

Figure 7:
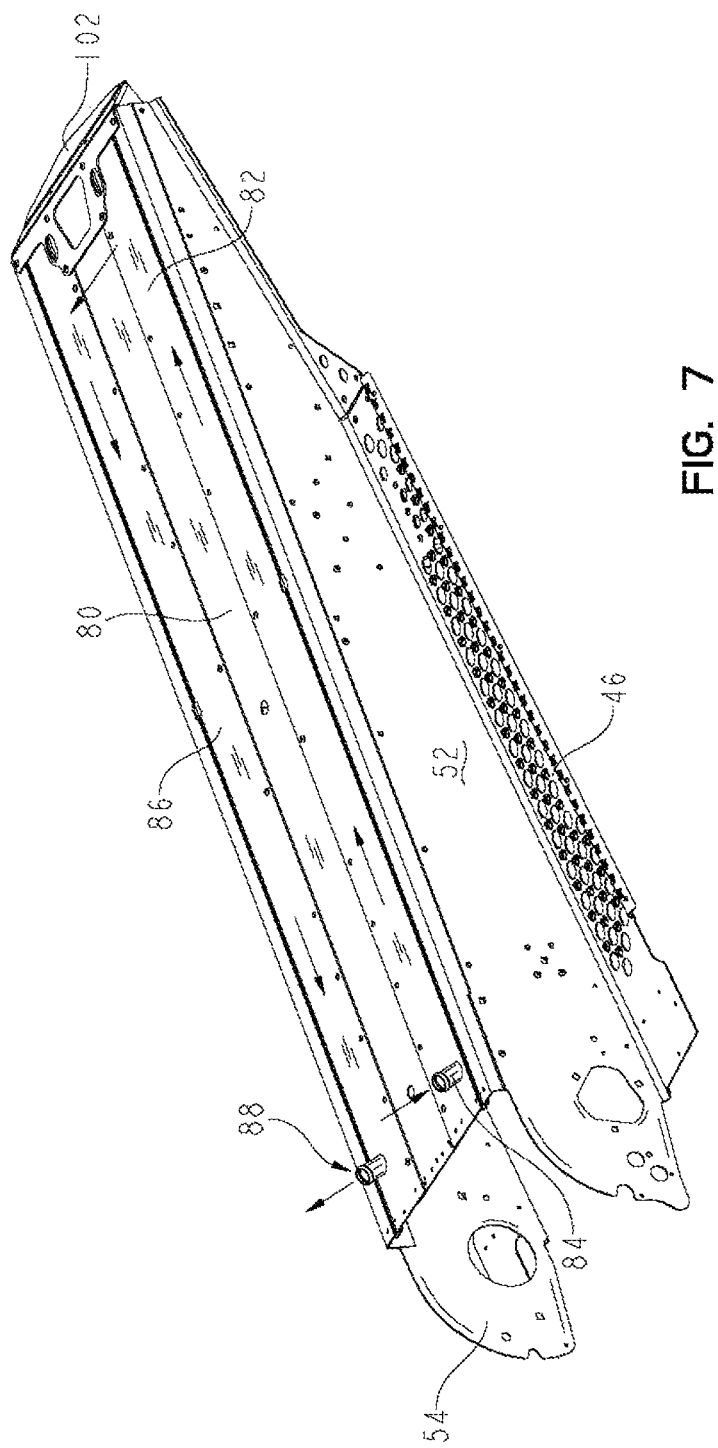
FIG. 7 is a perspective view of one embodiment of a tunnel assembly of the snowmobile shown in FIG. 1.

Referring now to FIG. 7, a profile view of tunnel 22 is shown. As shown in FIG. 1, tunnel 22 extends over endless belt assembly 12 and prevent snow and ice from contacting the rider positioned on seating assembly 14. Tunnel 22 includes side panel 52, heat exchanger 82, center panel 80, heat exchanger 86, and side panel 58. Heat exchangers 82 and 86 are coupled to the center panel 80 to form the top surface of tunnel 22. Side panel 52 is coupled to heat exchanger 82 to form the left side of tunnel 22 and side panel 58 is coupled to heat exchanger 86 to form the right side of heat exchanger 22. Bracket 102 is coupled to the rear end of heat exchangers 82 and 86 and may support a flap of material such as rubber to prevent snow from being thrown on the back of the rider. Heat exchanger 82 includes input 84 and plurality of channels 94 formed therein. Similarly, heat exchanger 86 includes output 88 and plurality of channels 96 formed therein.

Coolant from the motor of snowmobile 10 flows into inlet 84 and travels through heat exchangers 82 and 86 before exiting through output 88. In the illustrative embodiment, inlet 84 and output 88 are positioned on an end of tunnel 22, however they may be positioned at any suitable position along the longitudinal length of tunnel 22. Endless track assembly 12, which is positioned below tunnel 22, throws snow and ice upward to contact heat exchangers 82 and 86. The snow and ice provide and cooling effect for the coolant as is passes through heat exchangers 82 and 86. At the same time, heat from heat exchangers 82 and 86 prevent snow and ice build-up and packing under tunnel 22. In this embodiment, heat exchangers 82 and 84 are formed from extruded aluminum. However, any suitable material and method of construction may be used.

Figure 8:
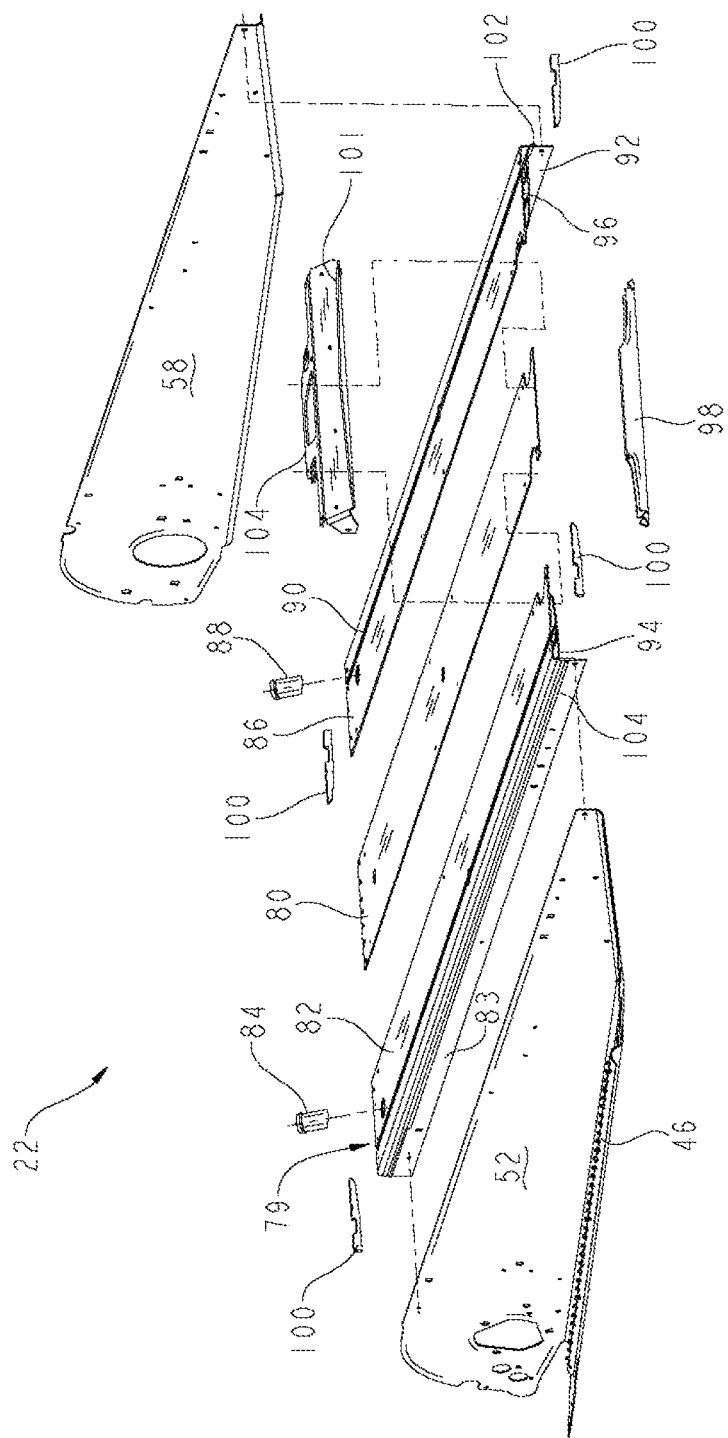
FIG. 8 is an exploded view of the tunnel assembly shown in FIG. 7.
Figure 9:
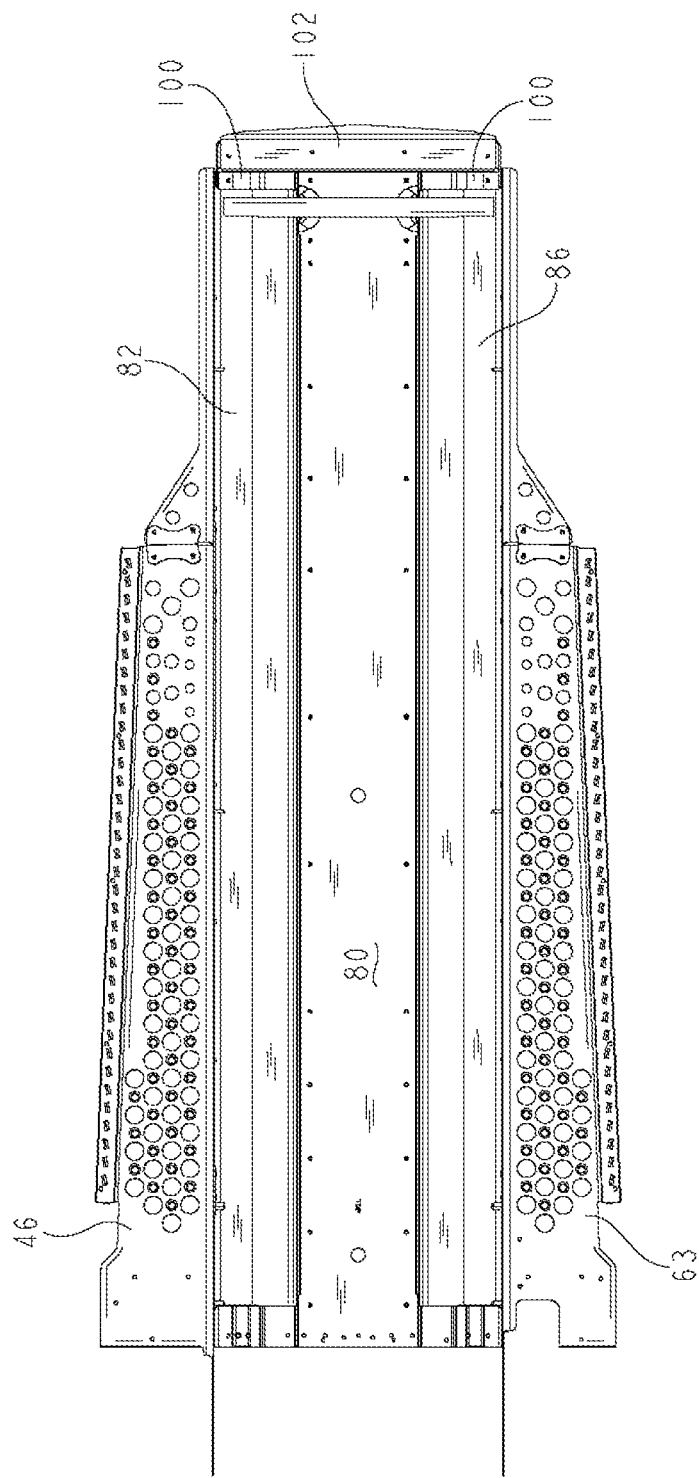
FIG. 9 is a bottom view of the tunnel assembly shown in FIGS. 7 and 8.
Figure 10:
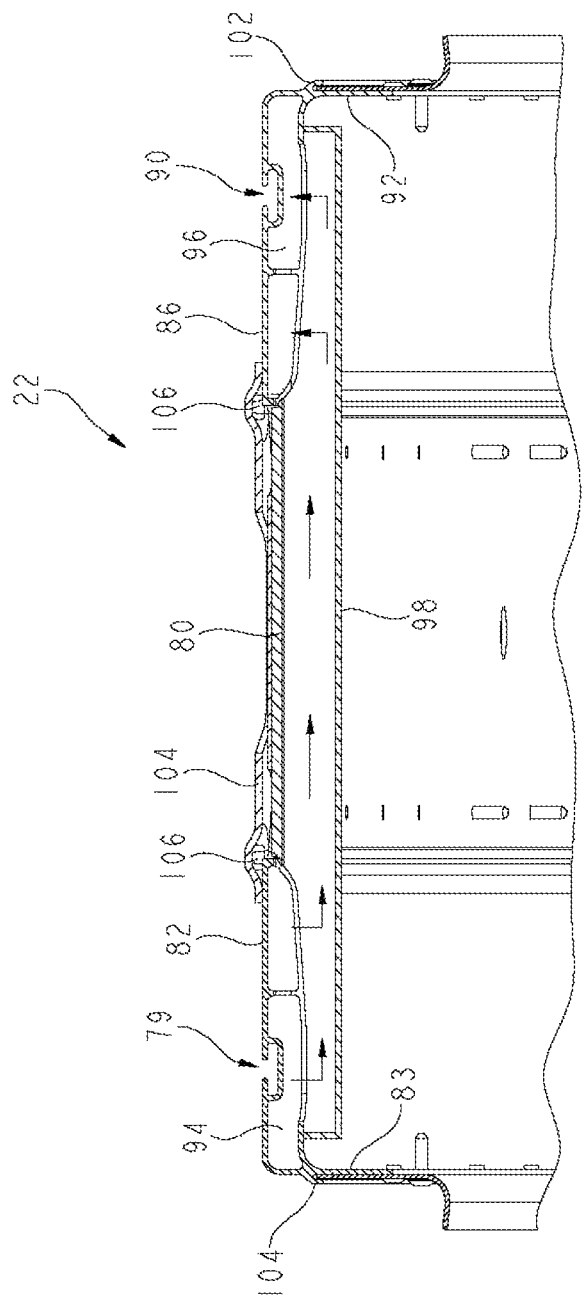
FIG. 10 is cross-sectional view of the rear end of the tunnel assembly shown in FIGS. 7-9.

Referring now to FIGS. 8 through 10, end caps 100 are coupled to each end of heat exchangers 82 and 86 to seal channels 94 and 96 respectively, the rear end of heat exchangers 82 and 86 is coupled to conducting duct 98. Conducting duct 98 allows fluid to pass from heat exchanger 82 to heat exchanger 86. In operation, heated coolant from the motor enters heat exchanger 82 through inlet 84 and flows through channels 94 to conducting duct 98. The coolant is then directed to the rear end of heat exchanger 86 and passes through channels 96 exiting heat exchanger 86 at outlet 88 and returning to the motor of snowmobile 10.

Figure 11:
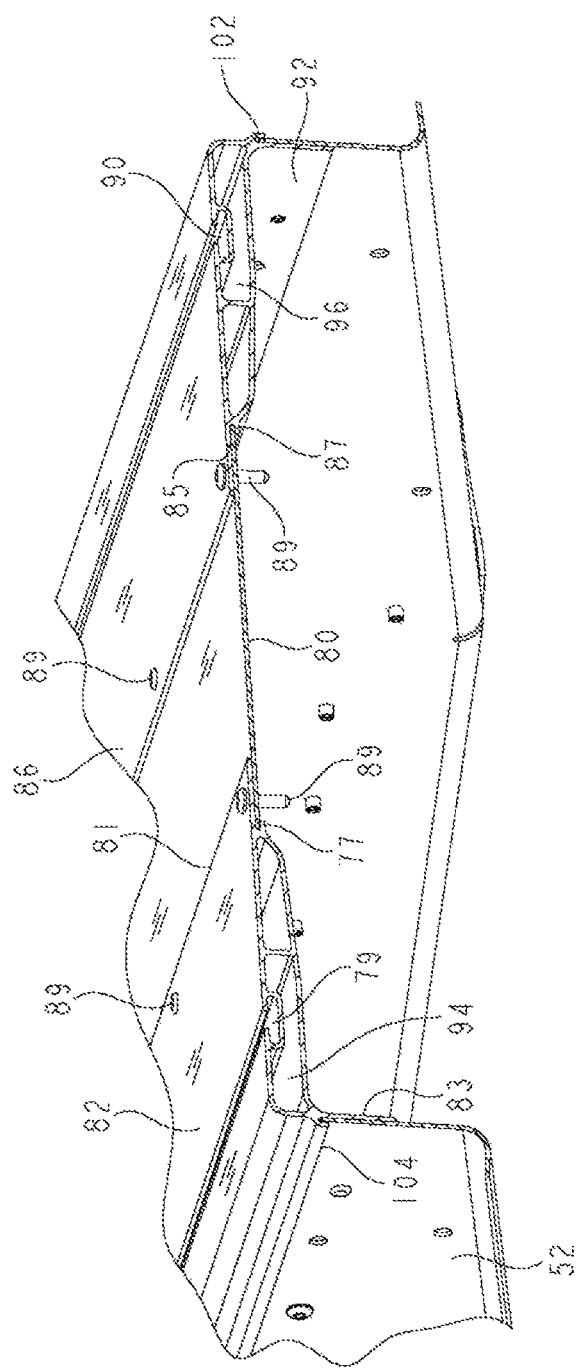
FIG. 11 is a cross-sectional view taken across a middle section of the tunnel assembly shown in FIGS. 7-10.

Referring now to FIG. 11, heat exchanger 82 includes a lower extension 83 and a flange 104 extending the longitudinal length of heat exchanger 82. As shown, the top edge of side panel 52 is adapted to be positioned between lower extension 83 and flange 104. Side panel 52 may be secured in this position by adhesive, rivets, machine screws, bolt, any combination thereof, or any other suitable fastener. Similarly, side panel 86 includes lower extension 92 and flange 102 which extend the entire longitudinal length of heat exchanger 86. Side panel 58 is adapted to be positioned between flange 102 and lower extension 92. Side panel 58 may be coupled to heat exchanger 86 by adhesive rivets, machine screws, bolt, any combination thereof, or any other suitable fastener. In a similar fashion, center panel 80 is coupled between heat exchangers 82 and 86. Heat exchanger 82 includes lateral extension 81 and lateral flange 77 extending the longitudinal length of heat exchanger 82. One edge of center panel 80 is positioned between lateral extension 81 and lateral flange 77. Heat exchanger 86 includes also includes lateral extension 85 and lateral flange 87. The opposing edge of center panel 80 is secured between lateral extension 85 and flange 87. Center panel 80 may be secured to heat exchangers 82 and 86 by adhesive, rivets, machine screws, bolt, any combination thereof, or any other suitable fastener. It should be noted that the width of center panel 80 may be varied to produce a tunnel having any suitable width. Additionally, in this embodiment, tunnel 22 is a modular design and may be constructed to any suitable length. In other embodiments, center panel 80 may be eliminated and heat exchangers 82 and 86 may be coupled directly together.

Figure 12:
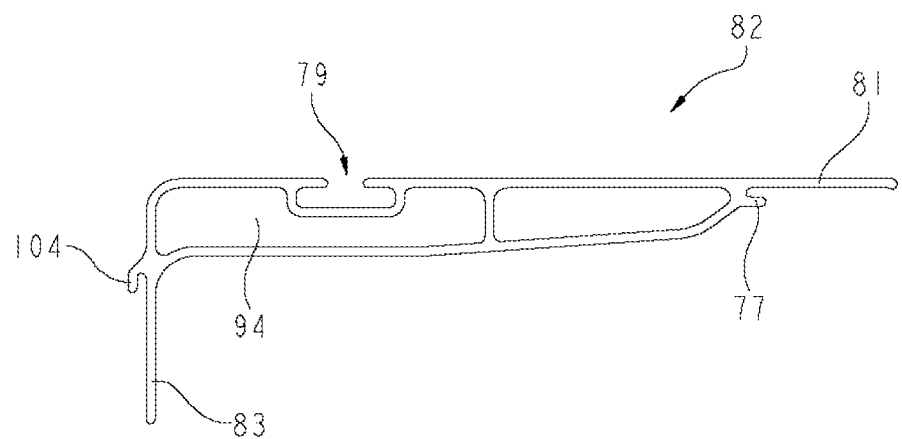
FIG. 12 is a cross-sectional view taken across a section of one component of the heat exchanger shown in FIGS. 1-11.

Referring now to FIG. 12, heat exchangers 82 and 86 also include longitudinally extending slots or recesses 79 and 90, respectively. Slots 79 and 90 provide a tunnel top attachment feature positioned along the longitudinal axis of the snowmobile. It should be noted that slots 79 and 90 may extend along the entire length of tunnel 22 or may extend only partially along the length of tunnel 22. Additionally, slots 79 and 90 may be positioned anywhere on the outer periphery of tunnel 22, such as the in or on side panels 52 and 58. Slots 79 and 90 are adapted to receive a fastener that may be used to secure accessories, handles, tool kits, or any other suitable item to tunnel 22. In this embodiment, slots 79 and 90 are integral to the tunnel assembly and prevent the need to any mounting holes or apertures in the tunnel assembly, which may weaken the tunnel assembly. In this embodiment, slots 79 and 90 are substantially inverted T-shapes, however, any suitably shaped slot may be used.

Figure 13:
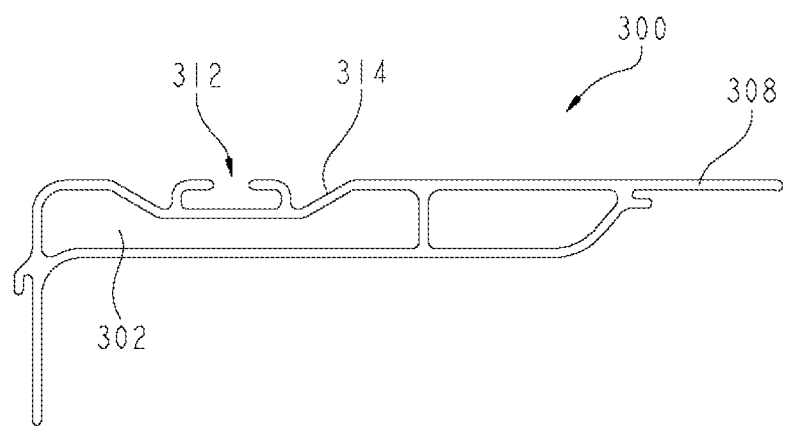
FIG. 13 is a cross-sectional view of an alternative embodiment heat exchanger similar to the heat exchanger shown in FIG. 12.

An alternative embodiment of slots 79, 90 is shown in FIG. 13. Heat exchanger 300 is similar to heat exchanger 82 with the exception that slot 312 is formed in recess 314 of channel 302 so that the top surface of slot 312 is flat or coplanar with the later extension 308. Slots 79 and 312 are inverted T-shaped slots, however any suitable shaped slot may be used. Additionally, an upwardly extending protrusion such as a T-shaped protrusion may be used instead of or in combination with a slot to provide an attachment surface. In other embodiments, a plate including a longitudinally extending slot and/or protrusion may be affixed to the top of the tunnel to provide an attachment feature above the tunnel of a snowmobile. In yet another embodiment, slots or protrusions may be integral with or attached to side panels 52 and/or 58 to provide attachment features. Another method of providing attachment features is described in U.S. Pat. No. 7,055,454, which is expressly incorporated by reference herein.

Figure 14:
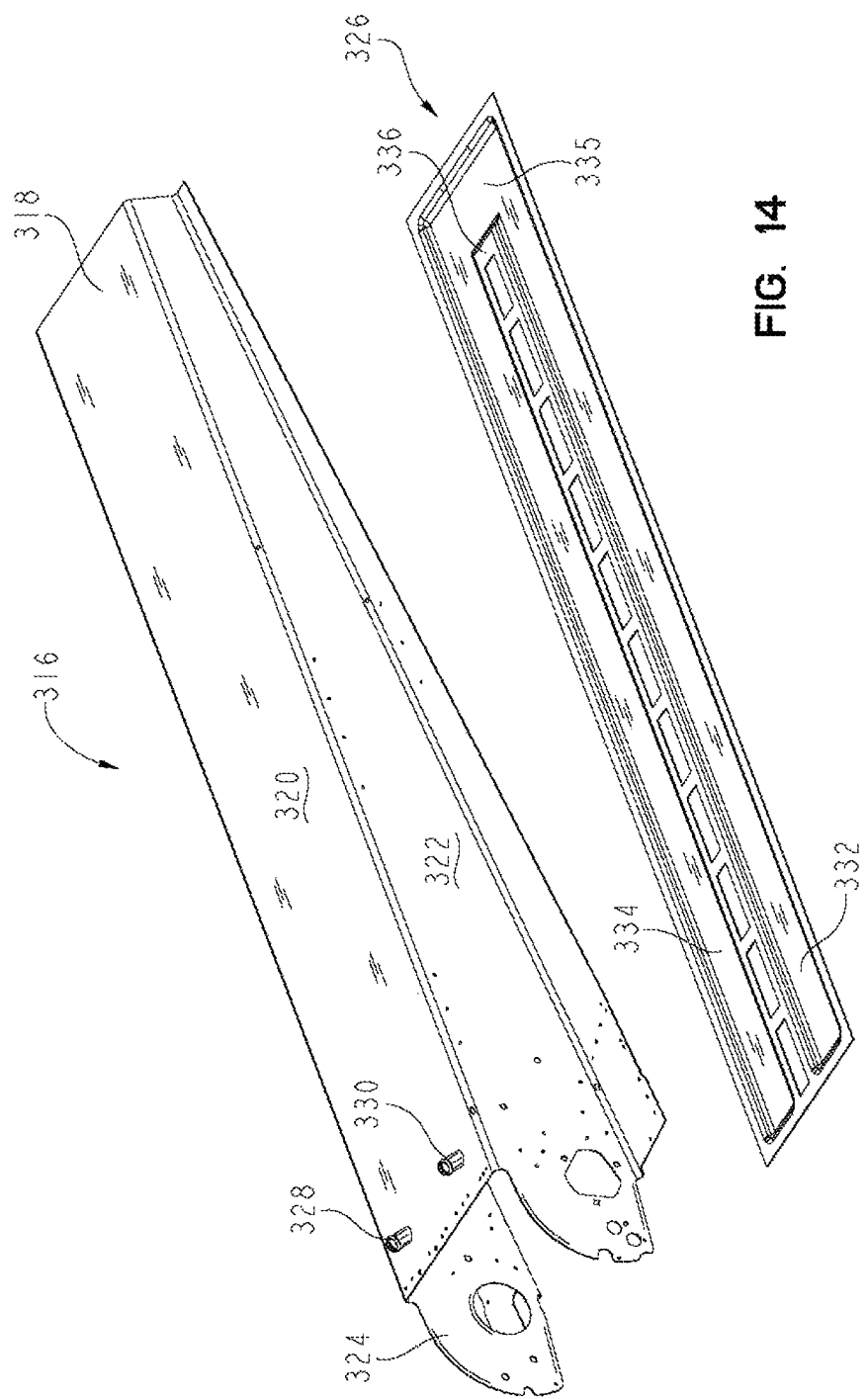
FIG. 14 is an exploded view of another embodiment of a tunnel assembly that may be used in a snowmobile such as the one shown in FIG. 1.
Figure 15:
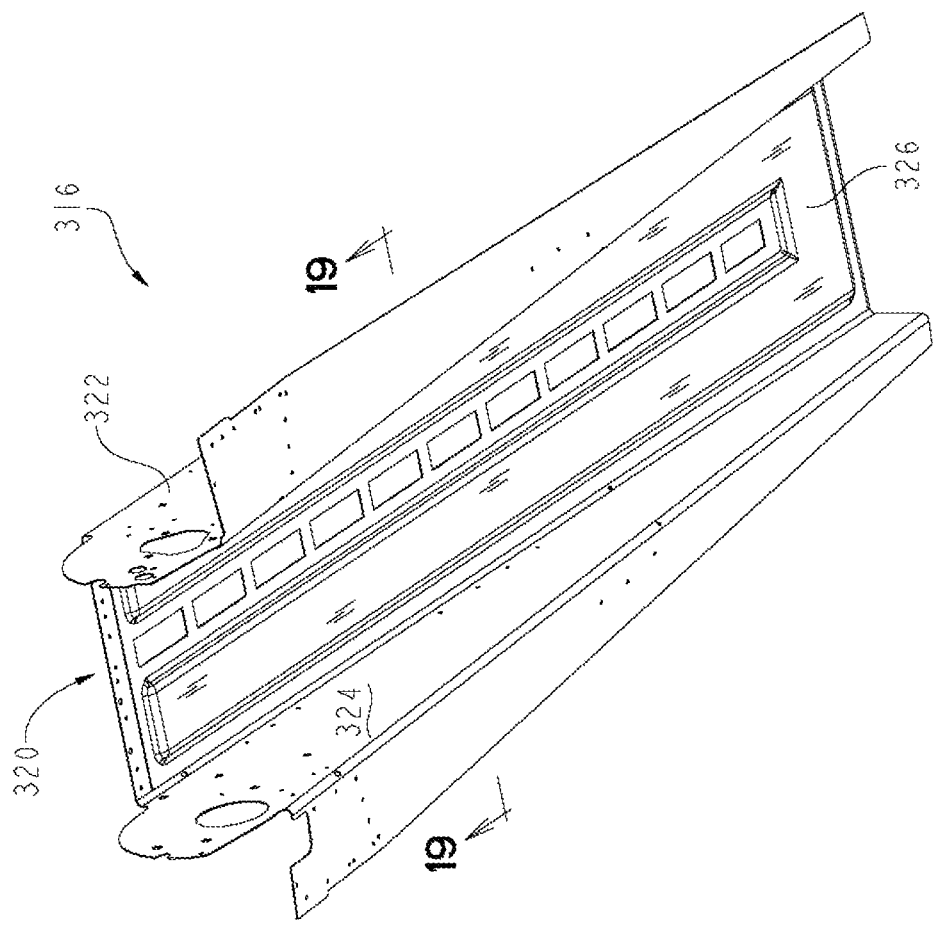
FIG. 15 is a perspective view of the bottom side of the tunnel assembly shown in FIG. 14.

Referring now to FIGS. 14 and 15, an alternative embodiment of the tunnel assembly for in FIGS. 7-11 is shown. Tunnel assembly 316 includes tunnel 318 which is formed by a single sheet of metal and includes side panels 322 and 324 and center panel 320. Center panel 318 includes inlet 330 and outlet 328 which are coupled to the liquid cooling system of the snowmobile, as discussed above. Tunnel assembly 316 also includes lower panel 326. Lower panel 326 includes channels 332 and 334, end channel 335, and center section 336. Lower panel 326 is coupled to the bottom side of center panel 318 to form a heat exchanger similar to the one described in FIGS. 7-11. A cross-sectional view is shown in FIG. 19. Coolant enters inlet 300 and flows down channel 332 to end channel 335. The coolant then flows from end channel 335 to channel 334 and to outlet 328. Center section 336 is also coupled to the lower side of center panel 318 to separate channels 332 and 334. Channels 332 and 334 may include a plurality of surfaces adapted to improve the heat transfer characteristics of tunnel assembly 316. Lower panel 326 may be coupled to center panel 318 by an adhesive, welding, or any other suitable method of attachment. It should be noted that inlet 330 and outlet 328 may be reversed.

Figure 16:
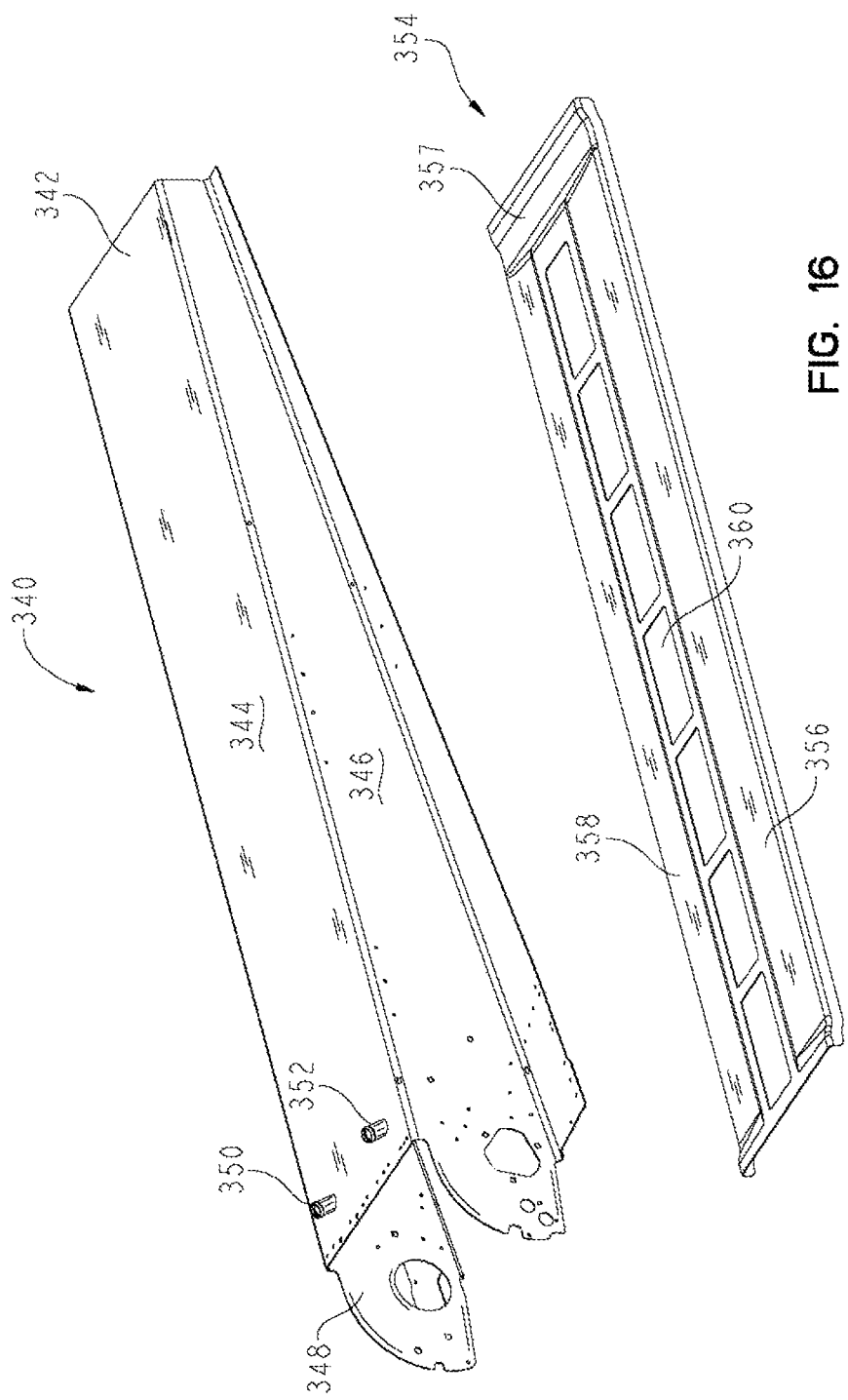
FIG. 16 is an exploded view of another embodiment of a tunnel assembly that may be used in a snowmobile such as the one shown in FIG. 1.
Figure 17:
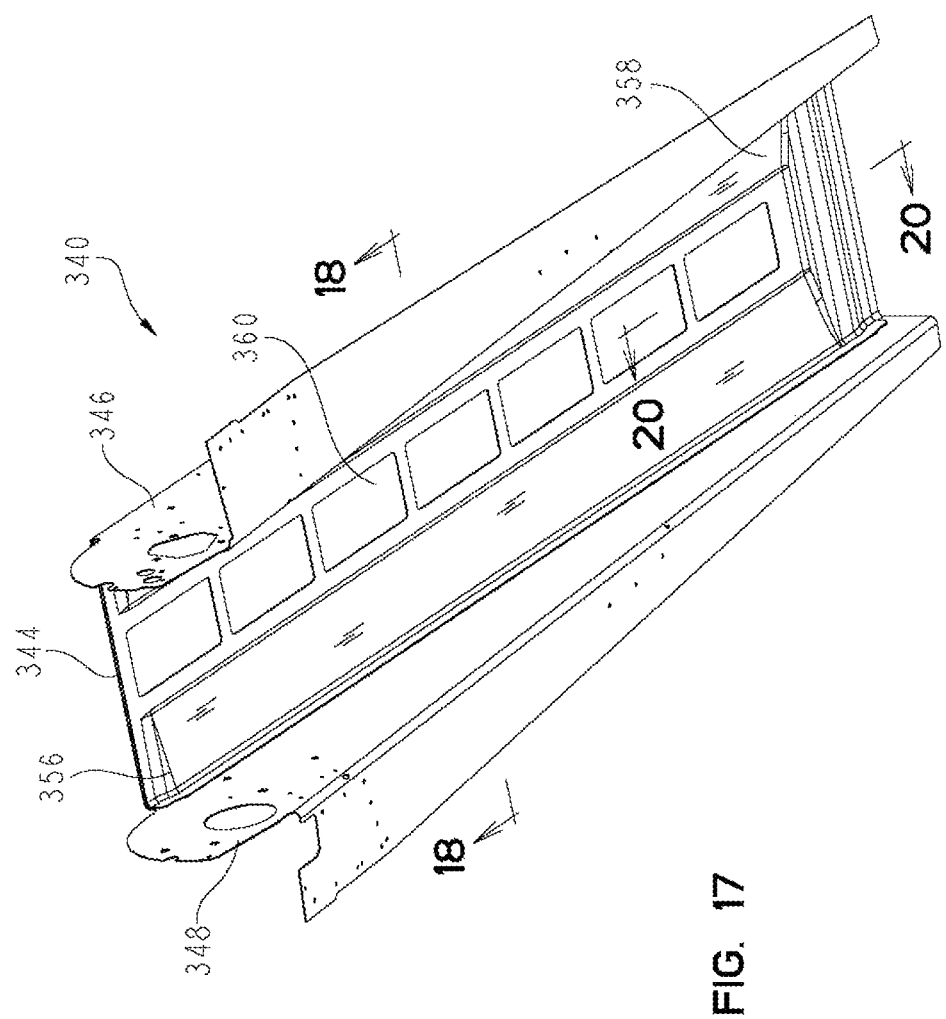
FIG. 17 is a perspective view of the bottom side of the tunnel assembly shown in FIG. 16.
Figure 20:
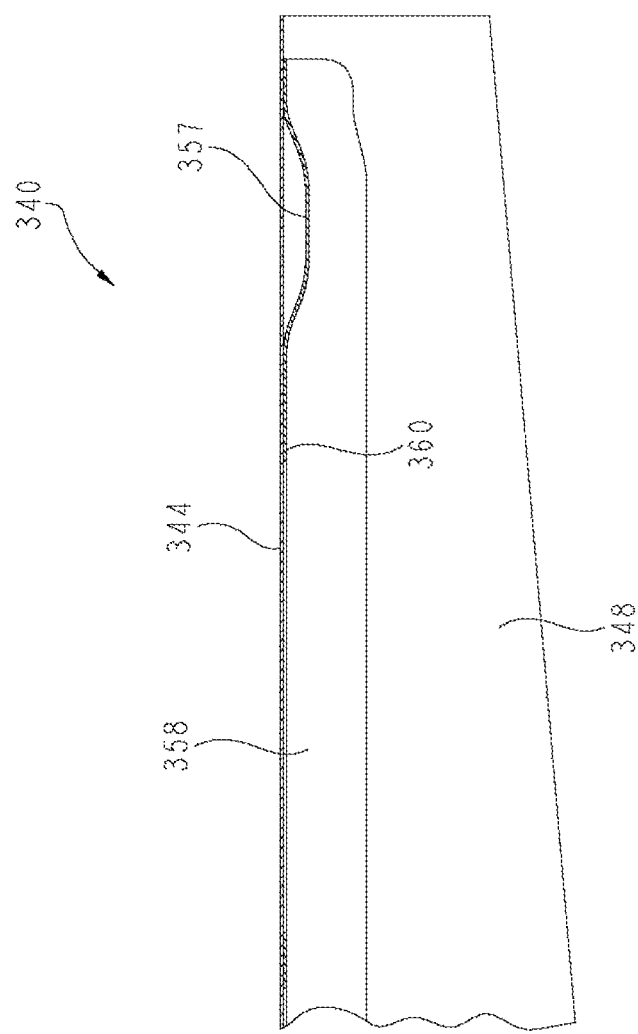
FIG. 20 is a cross-sectional view taken longitudinally across the rear portion of the tunnel assembly shown in FIGS. 16-18.

Referring now to FIGS. 16 and 17, another embodiment of a tunnel assembly is shown. Tunnel assembly 340 includes tunnel 342 which is formed by a single sheet of metal and includes side panels 346 and 348 and center panel 344. Center panel 344 includes inlet 352 and outlet 350 which are coupled to the liquid cooling system of the snowmobile, as discussed above. Tunnel assembly 340 also includes lower panel 354. Lower panel 354 includes channels 356 and 358, end channel 357, and center section 360. Lower panel 354 is coupled to the bottom side of center panel 344 to form a heat exchanger similar to the one described above in FIGS. 14 and 15. A cross-sectional view taken along a middle portion of the tunnel assembly 340 is shown in FIG. 18. Additionally, a cross-sectional view taken longitudinally along the back section of tunnel assembly 340 is shown in FIG. 20. Coolant enters inlet 352 and flows down channel 356 to end channel 357. The coolant then flows from end channel 357 to channel 358 and to outlet 350. Center section 360 is also coupled to the lower side of center panel 344 to separate channels 356 and 358. Channels 356 and 358 may include a plurality of surfaces adapted to improve the heat transfer characteristics of tunnel assembly 340. Lower panel 354 may be coupled to center panel 344 by an adhesive, welding, or any other suitable method of attachment. It should be noted that inlet 352 and outlet 350 may be reversed.

Figure 21:
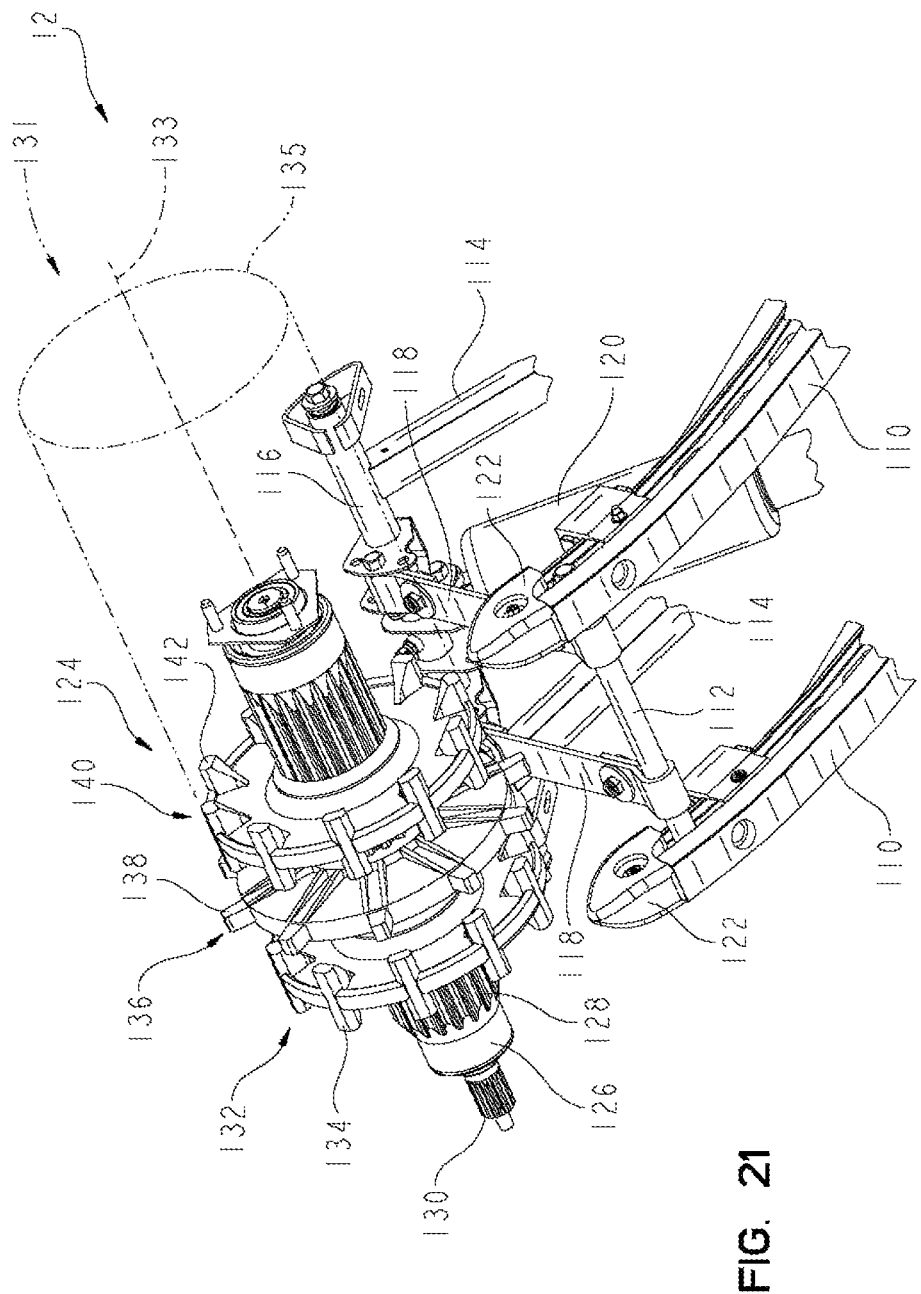
FIG. 21 is a partial perspective view of one embodiment of a drive system of the snowmobile shown in FIG. 1.

Referring now to FIG. 21, a partial profile view of drive system 124 of endless belt assembly 12 is shown, endless belt assembly 12 includes a pair of lower rails 110, a pair of front links 114, and a shock absorber 120 as well as various other components (not shown). Lower rails 110 are coupled together by cross shaft 112. Front links 114 are coupled together by cross shaft 116. Cross shaft 116 is also coupled to shock absorber 120. Lower rails 110 also include front tips 122. Straps 118 are coupled to cross shafts 112 and 116 to limit the travel of lower rails 110 relative to cross bar 116. Front and rear wheels 113 are coupled to lower rails 110. Wheels 113 contact a portion of belt 144 between wheels 113 and lower rails 110 to maintain the proper alignment of belt 144 at it rotates around endless belt assembly 12.

Figure 22:
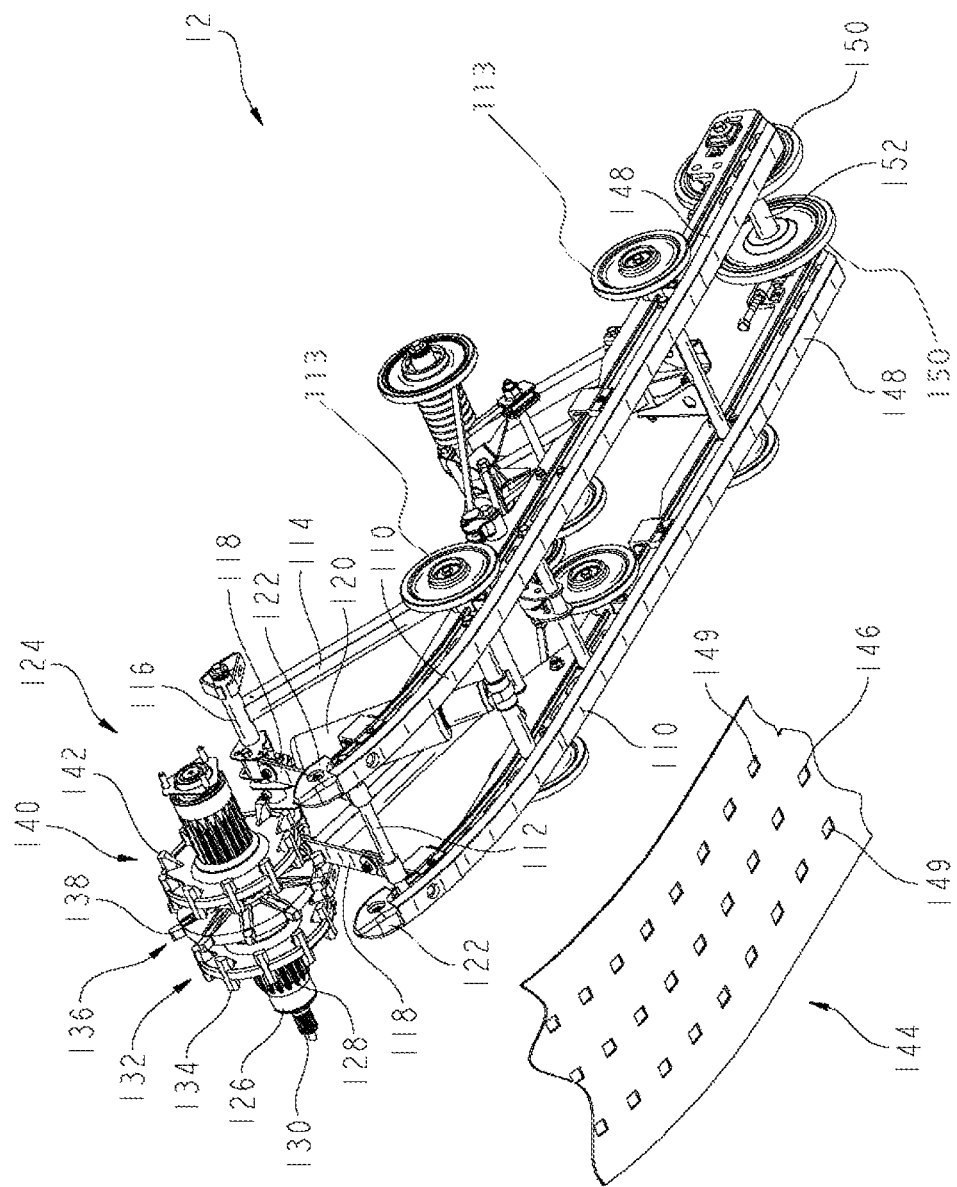
FIG. 22 is a partial perspective view of one embodiment of an endless belt assembly of the snowmobile shown in FIG. 1.

Drive system 124 includes shaft 126 which includes splined section 130 and splined section 128. Splined section 130 receives power from the motor and transmission of snowmobile 10 to rotate shaft 126. Splined section 128 engages sprockets 132, 136 and 140 which engage belt 144 as shown in FIGS. 22-25. Referring now to FIGS. 21 and 22, sprockets 132, 136 and 140 are positioned on shaft 126 at a position substantially in between front tips 122 of rails 110. Sprocket 132 includes a plurality of lateral extensions 134 positioned around its outer circumference. Similarly, sprocket 140 includes a plurality of lateral extensions 142 positioned around its outer circumference. Sprockets 132 and 140 have an involute orientation. Sprocket 136 is positioned between sprocket 132 and 140 and includes a plurality of circumferentially extending projections 138. Sprocket 136 has a convolute orientation. Shaft 126 also defines laterally extending axis 133. Theoretical cylindrical volume 131 is defined by axis 133 and diameter 135, which is equal to the diameter of sprocket 140. Cylindrical volume 131 extends laterally from drive system 124. During movement of endless belt assembly 12, such as during a jounce event, lower rails 110 may move upward or forward to a position in which front tips 122 of lower rails 110 intersect cylindrical volume 131. In this embodiment, drive system 124 includes three sprockets, however, any suitable number of sprockets and any suitable combination of involute and convolute orientation may be used.

Figure 23:
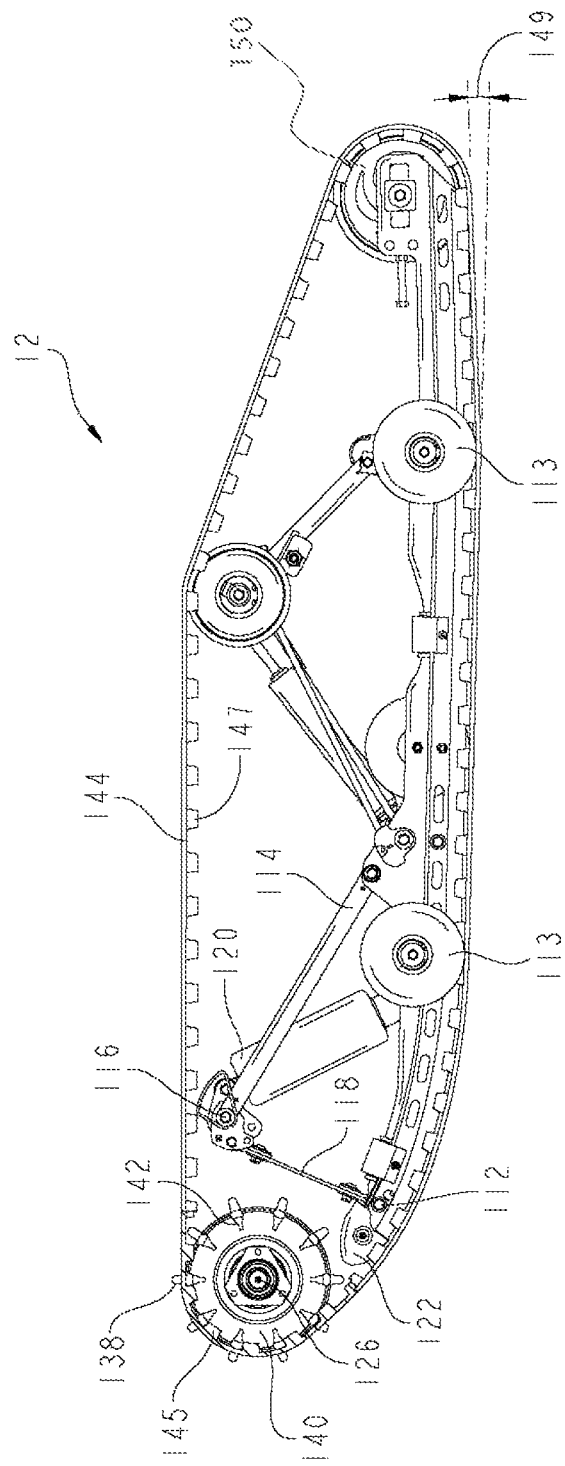
FIG. 23 is a partial profile view of the endless belt assembly shown in FIGS. 21 and 22.
Figure 24:
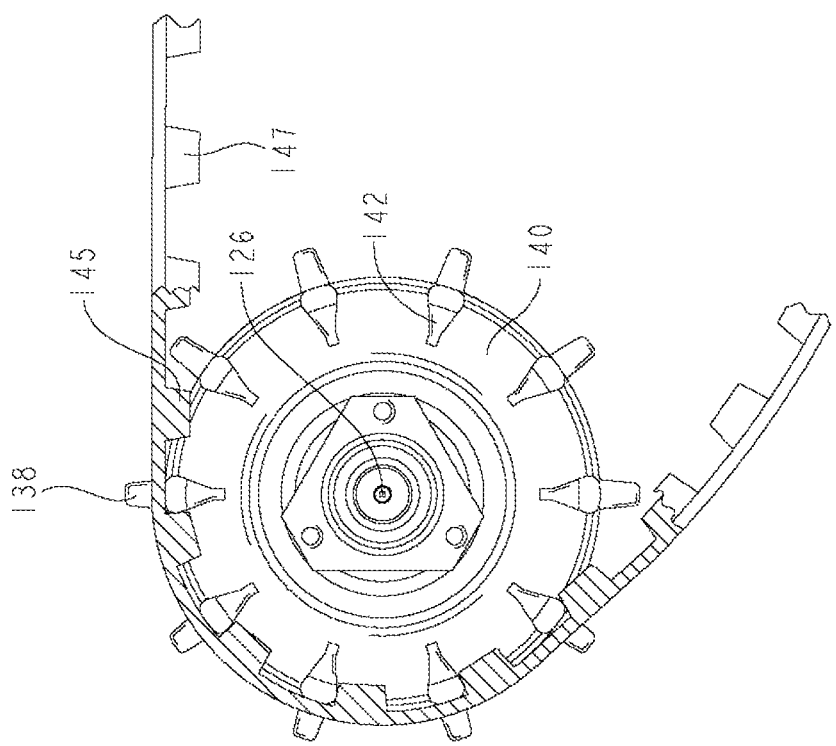
FIG. 24 is a partial profile view of the drive system of the endless belt assembly shown in FIGS. 21-23.
Figure 25:
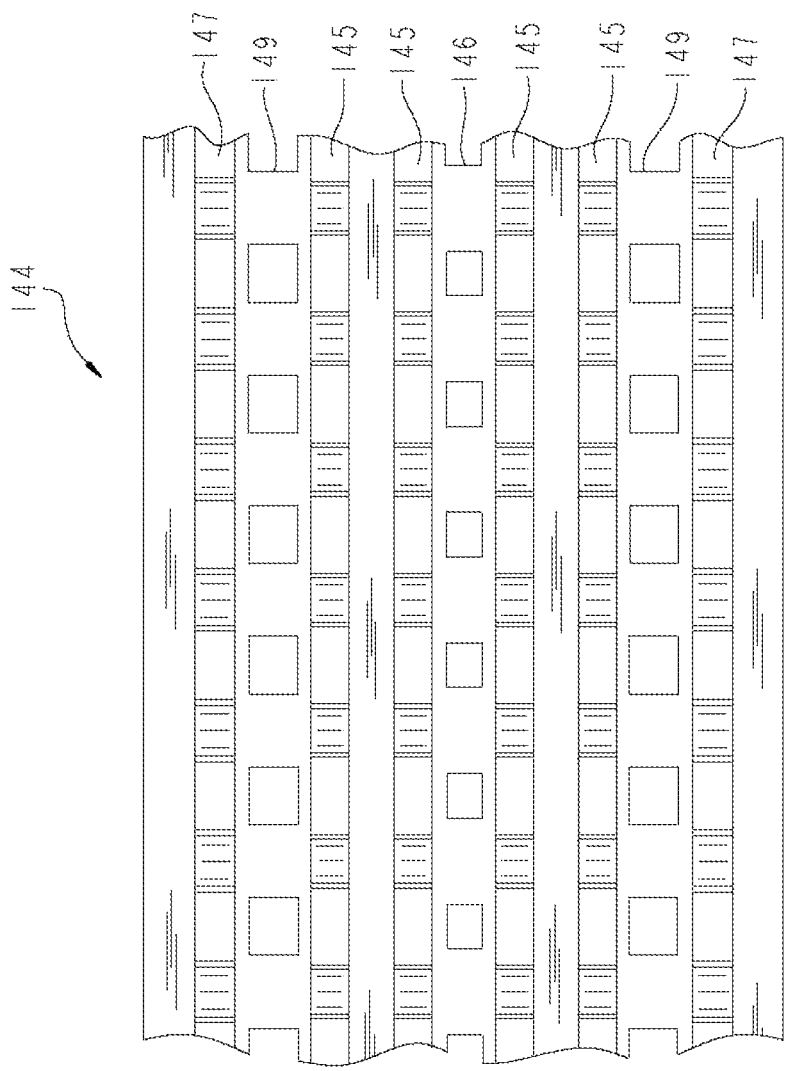
FIG. 25 is a partial top view of the belt of the endless belt drive shown in FIGS. 21-24.

Referring now to FIGS. 23 and 24, a profile view of endless belt assembly 12 is shown. As discussed above, circumferentially extending projections 138 of sprocket 136 engage apertures 146 in belt 144. Belt 144 also includes apertures 149, rows of outer teeth 147 and rows of inner teeth 145. Lateral extensions 134 and 142 of sprockets 132 and 140 engage rows of inner teeth 145 of belt 144. Rows of outer teeth 147 of belt 144 are positioned between lower rails 110 and idler pulleys 144 to maintain belt 144 in the proper orientation. Apertures 149 permit snow and ice to contact lower rails 110 to provide cooling and lubrication.

As shown in FIG. 23, lower rails 110 also include rear sections 148. Rear sections 148 of lower rails 110 include upward draft 149. In this embodiment, upward draft 149 is about three degrees, however any suitable amount of upward draft may be used on lower rails 110. In this embodiment, rear wheels 113 are located at the point at which upward draft 149 begins, however rear wheels 113 may be located at any suitable position. Handling and ride characteristics of snowmobile 10 may improve when rear wheels 113 are positioned within one radius of the beginning of upward draft 149. For example, if rear wheels 113 have a radius of 4 inches and upward draft 149 begins 12 inches from the end of lower rails 110, it may be beneficial to position rear wheels 113 between 10 and 14 inches from the rear end of lower rails 110. It should also be noted that positioning rear wheels 113 within one radius of the beginning of upward draft 149 may improve handling characteristics of snowmobile 10 when rear idler pulleys 150 are positioned between lower rails 110 rather than on the outer surface of lower rails 110 similar to wheels 113.

Figure 26:
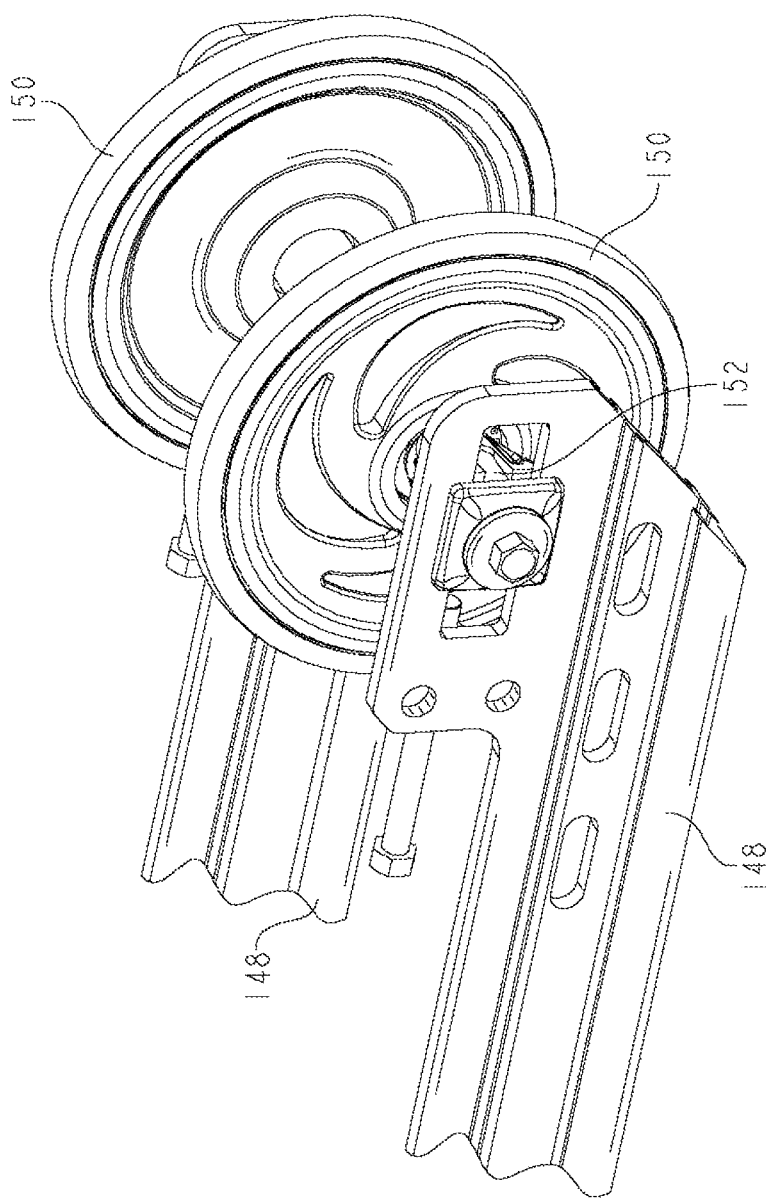
FIG. 26 is a partial perspective view of the rear end of the endless belt assembly shown in the FIGS. 22 and 23.

Referring now to FIG. 26, rear sections 144 of lower rails 110 is shown. Idler pulleys 150 are positioned between lower rails 110 on cross shaft 152. Idler pulleys 150 are positioned between plurality of inner projections 145 on belt 144 to provide the appropriate tension to belt 144 and maintain proper orientation of belt 144 during movement.

Figure 27:
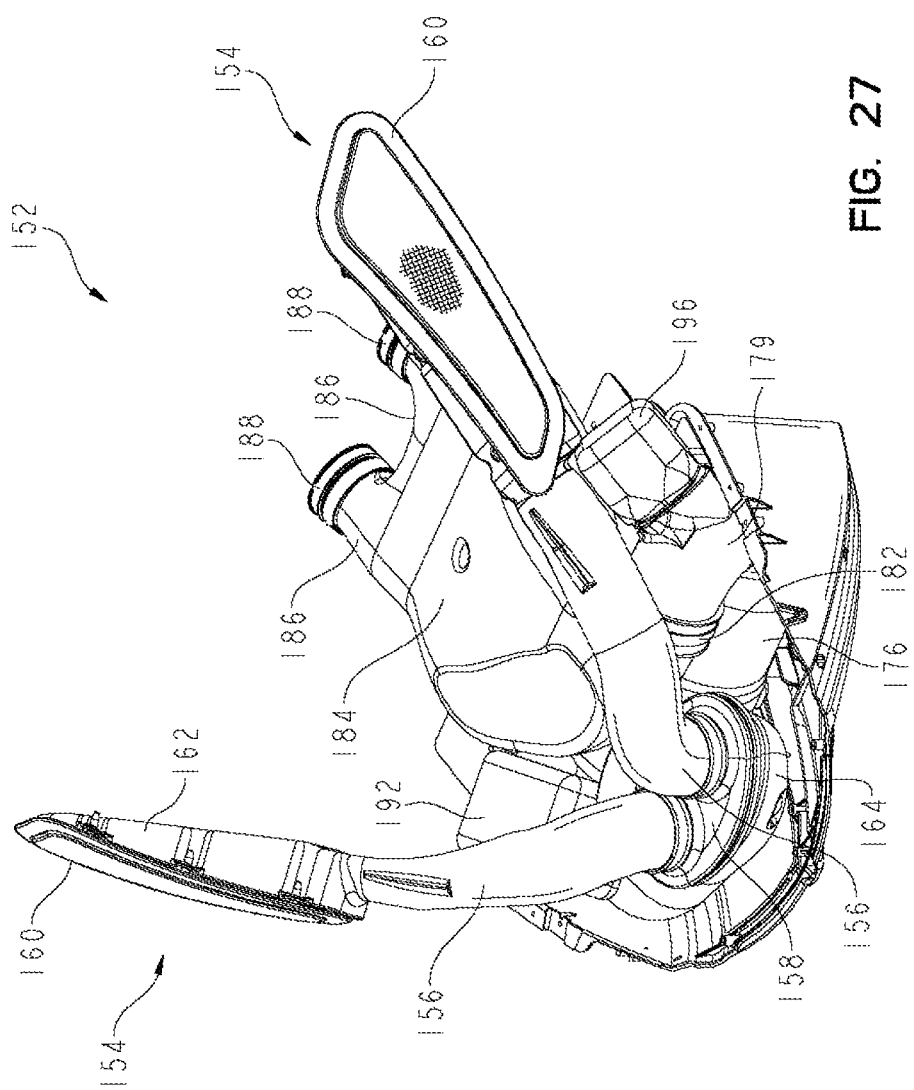
FIG. 27 is a perspective view of one embodiment of an air intake system of the snowmobile shown in FIG. 1.
Figure 28:
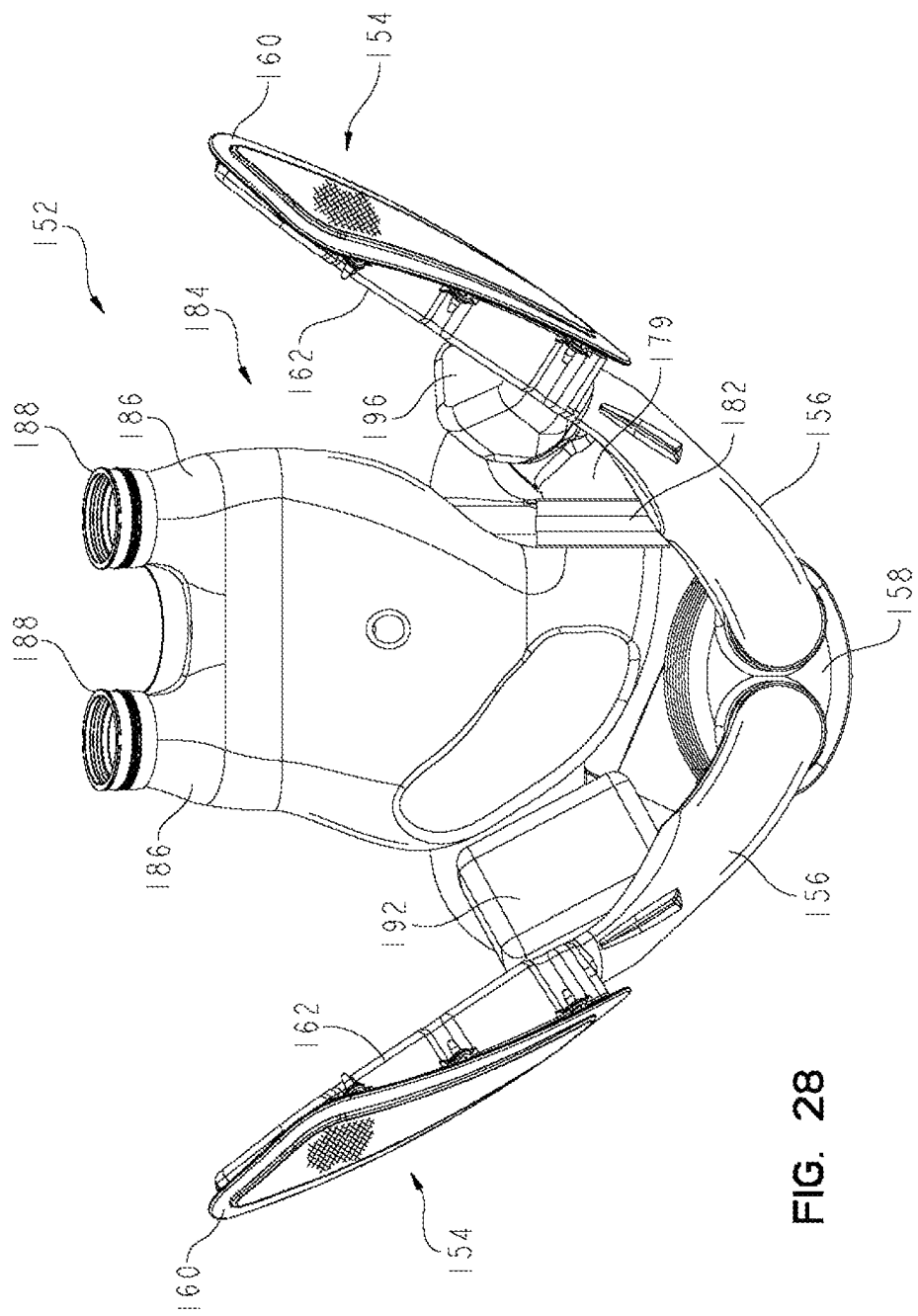
FIG. 28 is a partial top view of the air intake system shown in FIG. 27.
Figure 30:
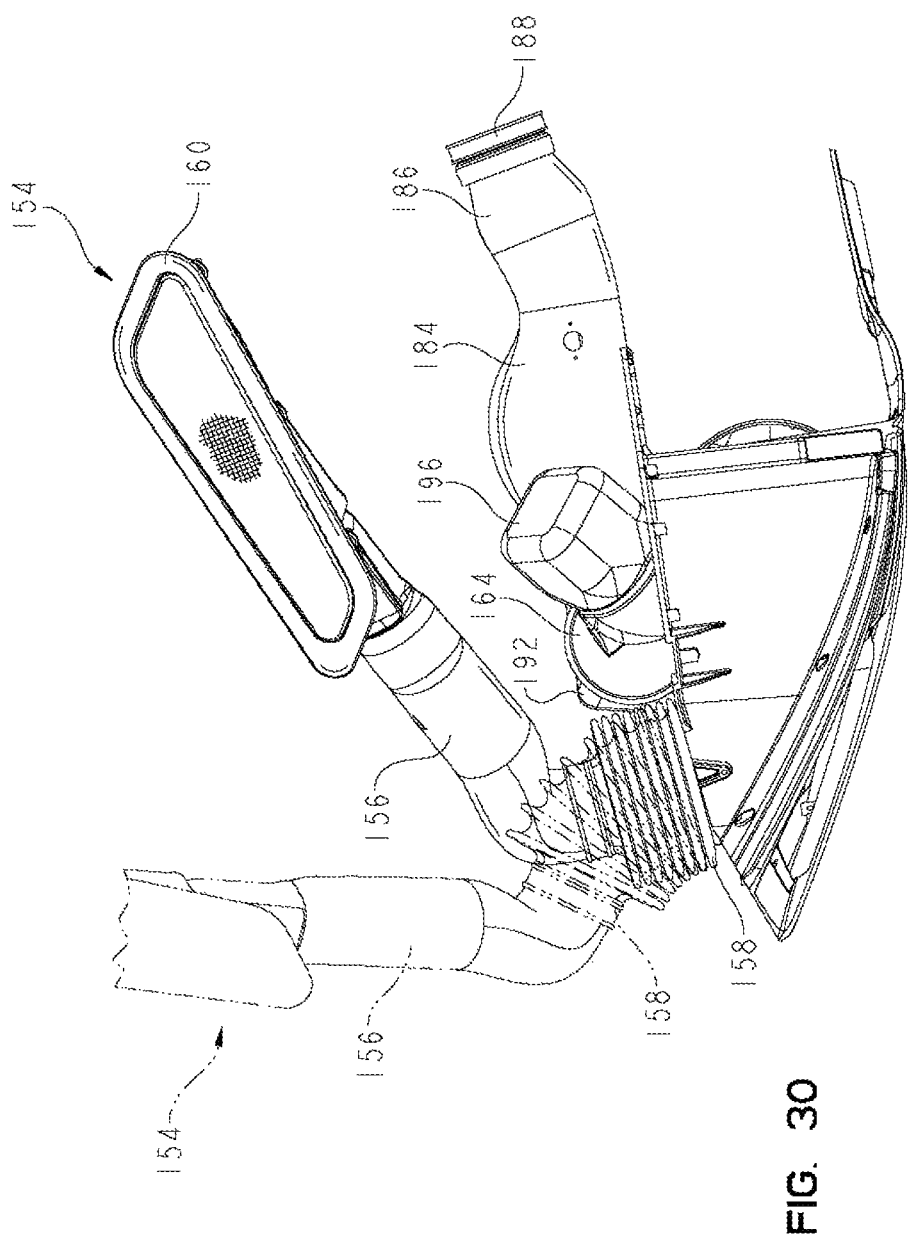
FIG. 30 is a profile view of the air intake system shown in the FIGS. 27-29 with the movement of the expandable section shown in phantom.

Referring now to FIGS. 27 and 28, air intake system 152 is shown. Air intake system 152 is positioned under hood 16 of snowmobile 10. Air intake system 152 includes air intakes 154, ducts 156, expandable section 158, lower duct 164, upper duct 176 and plenum 184. Air inlets 154 each include screen 160 and air collector 162. Screens 160 are positioned on hood 16 of snowmobile 10 to direct incoming air through air collectors 162 into ducts 156. Referring to FIG. 30, expandable section 158 is shown in the stationary position, with hood 16 in the default position, and in the raised position in phantom, with hood 16 raised.

Figure 29:
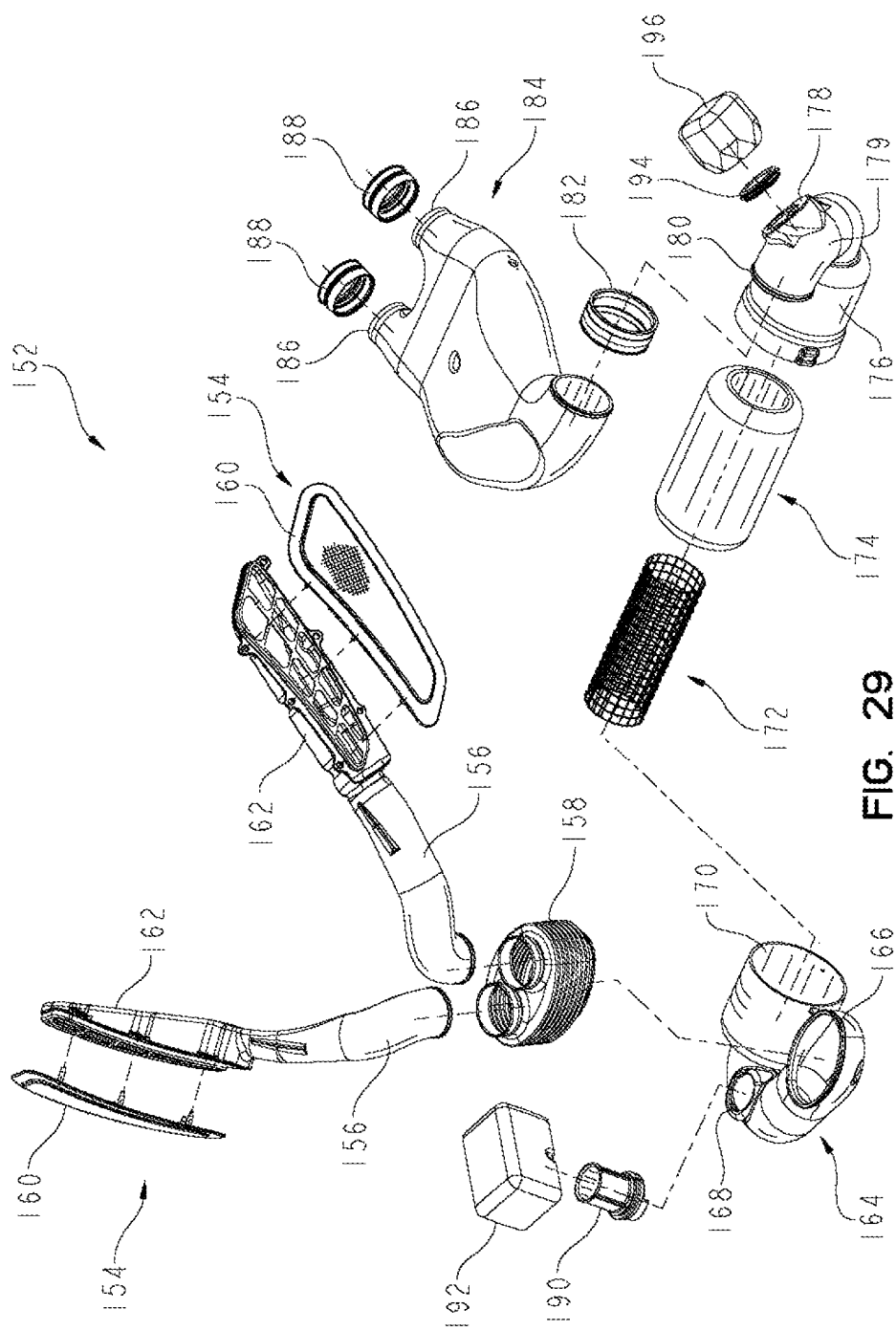
FIG. 29 is a partial exploded view of the air intake system shown in FIGS. 27 and 28.

Referring now to FIG. 29, air from ducts 156 enters expandable section 158 which is coupled to lower duct 164.

Expandable section 158 is positioned in opening 166 of lower duct 164. Lower duct 164 includes opening 168 and end 170. Opening 168 supports nozzle 190 and Helmholtz box 192. Screen 172 and resonator 174 are positioned in end 170 of lower duct 164. Upper duct 176 couples to end 170 of lower duct 164 to enclose resonator 174 and screen 172. Upper duct 176 includes curved portion 179 and end 180. Curved portion 179 includes aperture 178 which includes seal 194 and Helmholtz box 196. End 180 is coupled to seal 182 and plenum 184. Plenum 184 includes two outlets 186 which each include seals 188. Seals 188 are coupled to an intake manifold of the motor of snowmobile 10. Helmholtz boxes 192 and 196 cooperate with resonator 174 to reduce the noise of incoming air. Helmholtz boxes 192 and 196 may be adapted to tune incoming air to a pre-determined frequency that is suppressed by resonator 174 to reduce the noise generated by air intake system 152. For example, in a test snowmobile, the Helmholtz boxes and resonator were tuned to remove frequencies at 250, 500, and 750 Hertz. Helmholtz resonator's are designed and optimized by changing the volume of the plenum as well as the neck length and diameter to target a specific frequency. The frequency of attenuation of resonator 174 is a function of the hole size and spacing. Air intake system 152 includes a plurality of seals between the ducts to create a sealed system, thereby decreasing the likelihood of heating the air carried by air intake system 152 before it reaches the motor of snowmobile 10.

Figure 31:
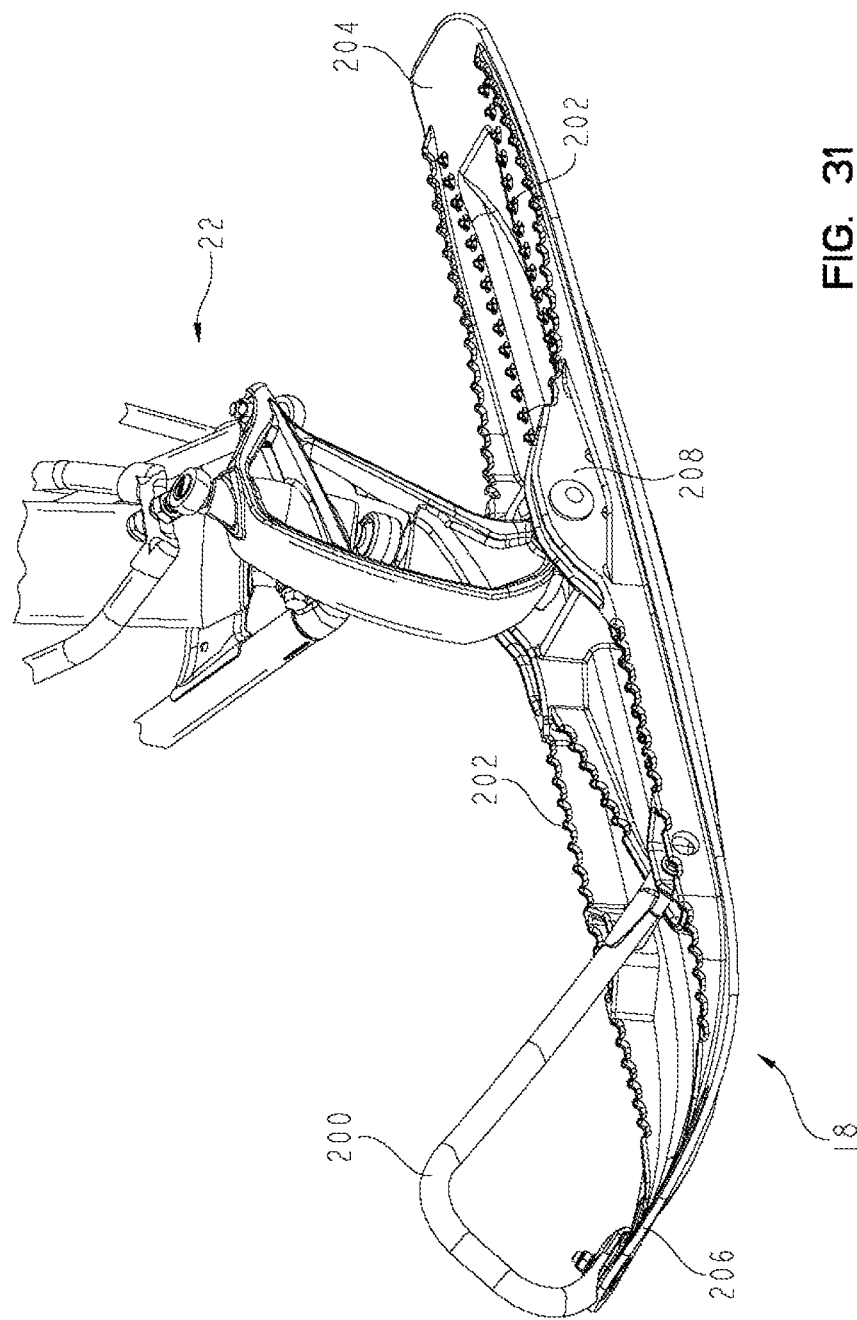
FIG. 31 is a partial perspective view of one embodiment of a front ski on the left side of the snowmobile shown in FIG. 1.

Referring now to FIGS. 31 and 35, left front ski 18 of snowmobile 10 is shown. Steering arm 22 of snowmobile 10 couples to front ski 18 at first position 208 of ski 18. Ski 18 includes front end 206 and rear end 204. Front end 206 includes hoop 200. The upper surface of ski 18 includes a plurality of projections 202 that are formed within the upper surface to provide traction to an operator who may stand on ski 18.

Referring now to FIGS. 32-34, a profile and bottom side view of ski 18 is shown. The lower surface of ski 18 includes keel 212 and runner 210. Runner 210 is supported by keel 212. Keel 212 includes front end 216 and rear end 214. Keel 212 extends longitudinally along the bottom side of ski 18 a length L. In this embodiment, at least 60% of the length L of keel 212 is in front of (in FIG. 32, to the left of) first position 208 which mounts to steering arm 22. In this embodiment, the ratio of the width of the middle of keel 212 to the width of runner 210 is about 4.3, however any suitable ration may be used.

As shown in FIG. 33, in this embodiment, rear end 214 of keel 212 is the widest portion of keel 212. Rear end 214 is substantially wider than front end 216 or any other portion of keel 212. In this embodiment, ski 18 is constructed of a plastic material and runner 210 is constructed of a metallic material, however any suitable material may be used to construct front ski 18 and runner 210.

Figure 36:
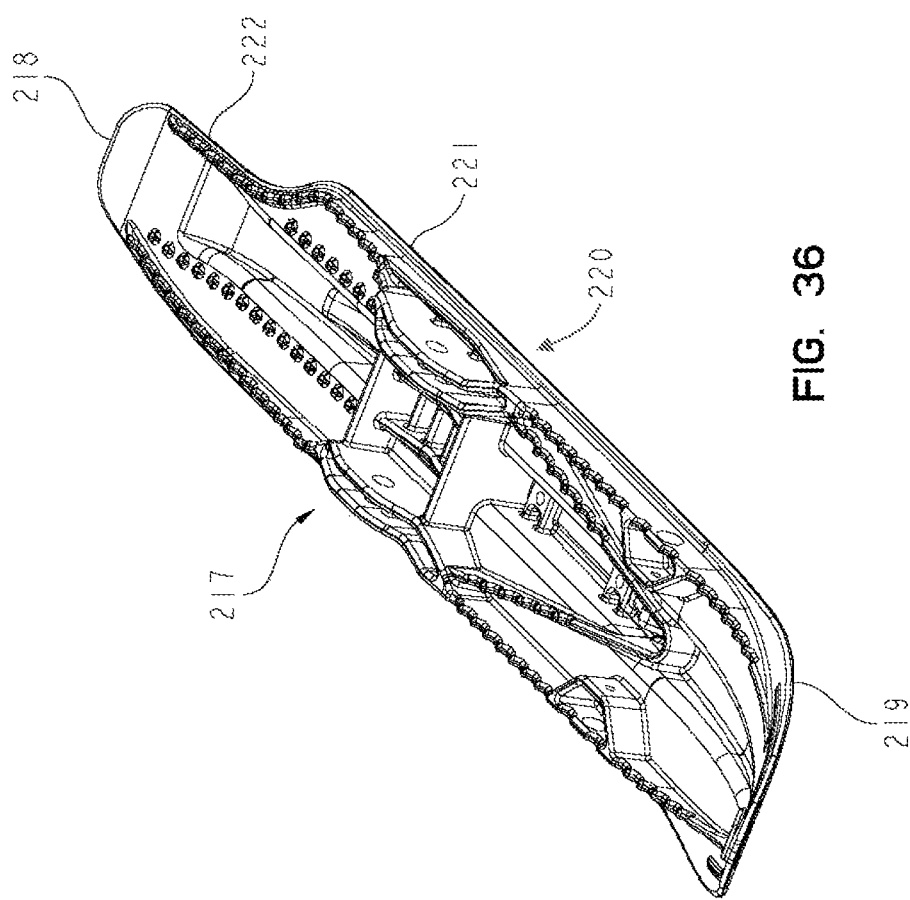
FIG. 36 is a perspective view of another embodiment of a front ski that may be positioned on either side of the snowmobile shown in FIG. 1.

Another embodiment of a front ski that may be used on snowmobile 10 is shown in FIG. 36. Front ski 217 may be coupled to steering arm 22 on either the left or right side of snowmobile 10. Ski 21 includes front end 219, middle portion 220 and rear end 218. Outer edge 221 of ski 217 includes a laterally recessed or notched portion 222 on rear end 218 of ski 217. In this embodiment, rear end 218 is substantially narrower than middle portion 220 of ski 217. Notched portion 220 of edge 212 may provide superior handling in certain conditions.

Figure 37:
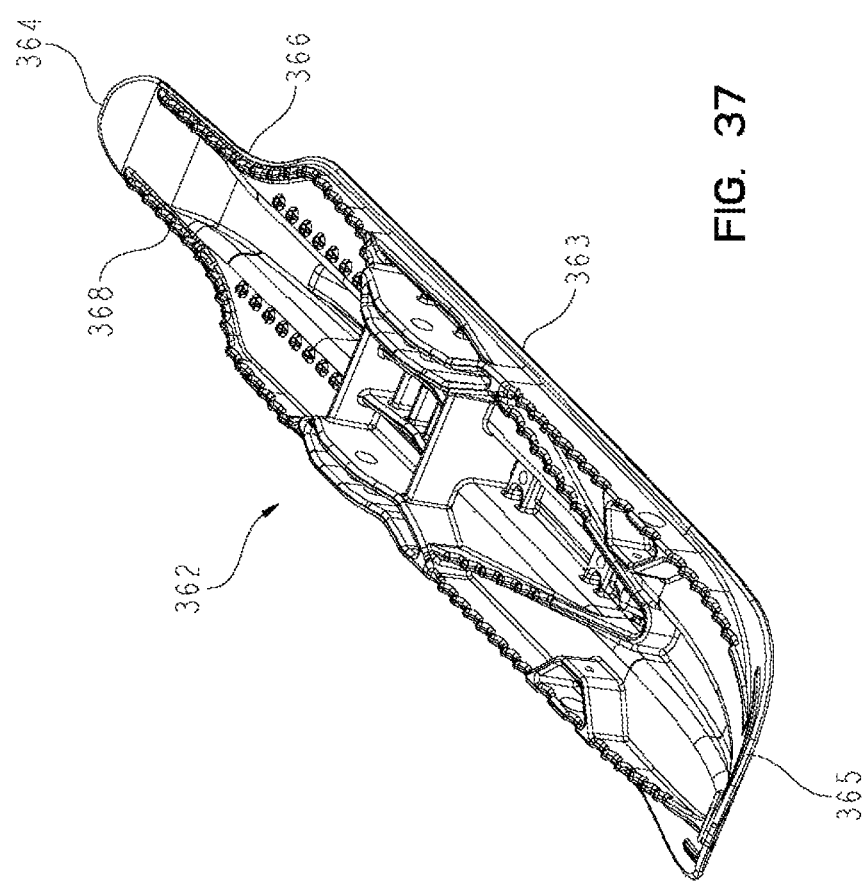
FIG. 37 is a perspective view of another embodiment of a front ski that may be positioned on the either side of the snowmobile shown in FIG. 1.

Another embodiment of a front ski that may be used on snowmobile 10 is shown in FIG. 37. Front ski 362 may be coupled to steering arm 22 on either the left or right side of snowmobile 10. Ski 362 includes front end 365, middle portion 363 and rear end 364. Outer edges 366 and 368 of ski 362 each include a laterally recessed or notched portion 366 and 368, respectively, on rear end 364 of ski 362. In this embodiment, rear end 364 is substantially narrower than middle portion 363 of ski 362. Notched portions 366 and 368 may provide superior handling in certain conditions.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A snowmobile, comprising:
a frame having a tunnel;
a seat configured to be supported on the tunnel;
an engine supported by the frame;
an endless belt assembly supported by the frame;
the tunnel including first and second longitudinally spaced-apart ends and extending above the endless belt assembly, the tunnel having a center panel and side panels, the center panel having an inlet and an outlet defined therethrough; and
a lower panel is coupled to a bottom side of the center panel such that the lower panel and the center panel together define an integral heat exchanger adapted to receive a coolant from the engine, wherein a lower surface of the center panel defines an upper wall of the heat exchanger and an upper surface of the center panel is exposed to an external environment, and the lower panel defining a fluid pathway having a first channel in fluid communication with the inlet and a second channel in fluid communication with the outlet.

2. The snowmobile of claim 1, wherein the first and second channels are defined by a downwardly extending deformation in the lower panel defining the fluid pathway in fluid communication with the inlet and outlet.

3. The snowmobile of claim 2, wherein an end channel couples the first and second channels.

4. The snowmobile of claim 3, wherein the fluid pathway is generally U-shaped.

5. The snowmobile of claim 1, wherein the first and second channels extend from a position adjacent a front of the center panel to a position adjacent a rear of the center panel.

6. The snowmobile of claim 5, wherein an end channel couples the first and second channels.

7. The snowmobile of claim 1, wherein the lower panel further comprises a center section coupled to the lower side of center panel to separate the first and second channels.

8. The snowmobile of claim 1, wherein the lower panel is coupled to the center panel by an adhesive.

9. The snowmobile of claim 1, wherein the lower panel is coupled to the center panel by welding.

\* \* \* \* \*